US012602561B2

(12) United States Patent
Yamashita et al.

(10) Patent No.: US 12,602,561 B2
(45) Date of Patent: Apr. 14, 2026

(54) IMAGE PROCESSING DEVICE, PRINTING SYSTEM, AND IMAGE PROCESSING PROGRAM

(71) Applicant: SEIKO EPSON CORPORATION, Tokyo (JP)

(72) Inventors: Mitsuhiro Yamashita, Matsumoto (JP); Takahiro Kamada, Matsumoto (JP); Takuya Ono, Shiojiri (JP); Yuko Yamamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 309 days.

(21) Appl. No.: 18/436,066

(22) Filed: Feb. 8, 2024

(65) Prior Publication Data

US 2024/0273323 A1 Aug. 15, 2024

(30) Foreign Application Priority Data

Feb. 10, 2023 (JP) ................................. 2023-018975

(51) Int. Cl.
| | |
|---|---|
| *G06K 15/02* | (2006.01) |
| *G06T 15/04* | (2011.01) |
| *H04N 1/00* | (2006.01) |

(52) U.S. Cl.
CPC ....... *G06K 15/023* (2013.01); *G06K 15/1859* (2013.01); *G06K 15/1868* (2013.01); *G06K 15/1878* (2013.01); *G06T 15/04* (2013.01); *H04N 1/00708* (2013.01)

(58) Field of Classification Search
None
See application file for complete search history.

(56) References Cited

U.S. PATENT DOCUMENTS

| | | | | |
|---|---|---|---|---|
| 11,989,473 B1* | 5/2024 | Yamashita | ............ | G06F 3/1208 |
| 2015/0248596 A1* | 9/2015 | Tanaka | ............... | G03G 15/5062 |
| | | | | 358/3.24 |
| 2015/0317543 A1* | 11/2015 | Fujita | .................... | G06F 3/1244 |
| | | | | 358/1.15 |
| 2018/0134476 A1* | 5/2018 | Rosenzweig | ........... | B32B 27/10 |
| 2019/0354328 A1* | 11/2019 | Tajima | .................. | G06F 3/1288 |

FOREIGN PATENT DOCUMENTS

JP 2019-201264 A 11/2019

* cited by examiner

*Primary Examiner* — Haris Sabah
(74) *Attorney, Agent, or Firm* — Spencer Fane LLP

(57) ABSTRACT

An image processing device includes a shielding degree calculation section that calculates a shielding degree of a printed layer, and a rendering section. The rendering section is configured to generate at least one of the front surface view, in which the printed object is observed from the front surface side, and the back surface view, in which the printed object is observed from the back surface side, by mapping an image data, which is color converted, to a 3D object and by performing rendering using the shielding degree of the printed layer.

12 Claims, 22 Drawing Sheets

FRONT SURFACE VIEW

BACK SURFACE VIEW

<FRONT SURFACE VIEW>

<BACK SURFACE VIEW>

FRONT SURFACE VIEW

BACK SURFACE VIEW

<FRONT SURFACE VIEW>      <BACK SURFACE VIEW>

FRONT SURFACE VIEW

PT2

PL

SL   WL

PM

BACK SURFACE VIEW

<FRONT SURFACE VIEW>       <BACK SURFACE VIEW>

PM                   PM

WG     SG                WG

FRONT SURFACE VIEW

BACK SURFACE VIEW

<FRONT SURFACE VIEW>   <BACK SURFACE VIEW>

FRONT SURFACE VIEW

PT4

BACK SURFACE VIEW

<FRONT SURFACE VIEW>          <BACK SURFACE VIEW>

FRONT SURFACE VIEW

PT5

BACK SURFACE VIEW

<FRONT SURFACE VIEW>     <BACK SURFACE VIEW>

SMp

β p

| 0.10 | 0.05 | 0.10 | 0.10 | 0.10 | 0.05 | 0.10 | 0.10 |
|------|------|------|------|------|------|------|------|
| 0.10 | 0.10 | 0.10 | 0.10 | 0.08 | 0.10 | 0.10 | 0.10 |
| 0.10 | 0.10 | 0.08 | 0.10 | 0.10 | 0.05 | 0.10 | 0.10 |
| 0.10 | 0.12 | 0.10 | 0.12 | 0.10 | 0.10 | 0.12 | 0.10 |
| 0.10 | 0.10 | 0.08 | 0.10 | 0.08 | 0.10 | 0.10 | 0.05 |
| 0.10 | 0.08 | 0.10 | 0.10 | 0.05 | 0.10 | 0.10 | 0.10 |
| 0.10 | 0.10 | 0.12 | 0.10 | 0.12 | 0.10 | 0.10 | 0.10 |

SHp

| MEDIUM | βp |
|--------|------|
| A | 0.05 |
| B | 0.1 |
| C | 0.3 |

FIG. 18

<FRONT SURFACE VIEW>

IMAGE PROCESSING DEVICE, PRINTING SYSTEM, AND IMAGE PROCESSING PROGRAM

The present application is based on, and claims priority from JP Application Serial Number 2023-018975, filed Feb. 10, 2023, the disclosure of which is hereby incorporated by reference herein in its entirety.

BACKGROUND

1. Technical Field

The present disclosure relates to an image processing device, a printing system, and an image processing program.

2. Related Art

JP-A-2019-201264 discloses an image processing device that generates a display image viewed from the front surface side and a display image viewed from the back surface side of a printed object, which is specified to be back printed on a transparent recording medium, and displays them.

However, the related art has room for improvement in terms of reproducing the appearance of a printed object printed using a transparent print medium in real space without a feeling of incongruity. This is a common issue not only when using the transparent print medium, but also when using a translucent print medium or an opaque print medium.

SUMMARY

According to a first aspect of this disclosure, an image processing device is provided. This image processing device includes an image data acquisition section that acquires image data; a printing condition acquisition section that acquires a printing condition including a type of a print medium; a color conversion section that performs color conversion on the image data according to the printing condition; a shielding degree calculation section that calculates a shielding degree of a printed layer for a printed object, wherein the printed layer is formed on the front surface of the print medium, which is transparent or translucent; and a rendering section that generates a rendering image, which represents the printed object, by performing rendering on the 3-dimensional object, which represents the shape of the print medium, by mapping the image data on which the color conversion was performed. The rendering section is configured to generate at least one of a front surface view of the printed object, which is observed from a front surface side, and a back surface view of the printed object, which is observed from a back surface side, by performing the rendering using the shielding degree of the printed layer.

According to a second aspect of this disclosure, a printing system is provided. This printing system includes an image processing device according to the first aspect; a display device that displays the rendering image generated by the image processing device; and a printing device that prints the printed object.

According to a third aspect of this disclosure, a non-transitory computer-readable recording medium having stored therein an image processing program is provided. This non-transitory computer-readable recording medium having stored therein the image processing program causes a computer to perform: an image data acquisition function that acquires image data; a printing condition acquisition function that acquires a printing condition including a type of a print medium; a color conversion function that performs color conversion on the image data according to the printing condition; a shielding degree calculation function that calculates a shielding degree of a printed layer, with respect to a printed object in which the printed layer is formed on the front surface of the print medium, which is transparent or translucent; and a rendering function that generates a rendering image, which represents the printed object, by performing rendering on the 3-dimensional object, which represents the shape of the print medium, by mapping the image data on which the color conversion was performed, wherein the rendering function includes a function to generate at least one of a front surface view of the printed object observed from a front surface side and a back surface view of the printed object observed from a back surface side, by performing the rendering using the shielding degree of the printed layer.

BRIEF DESCRIPTION OF THE DRAWINGS

FIG. 18 is an explanatory diagram showing an example of medium shielding degree information.

DESCRIPTION OF EMBODIMENTS

A. First Embodiment

Figure 1:
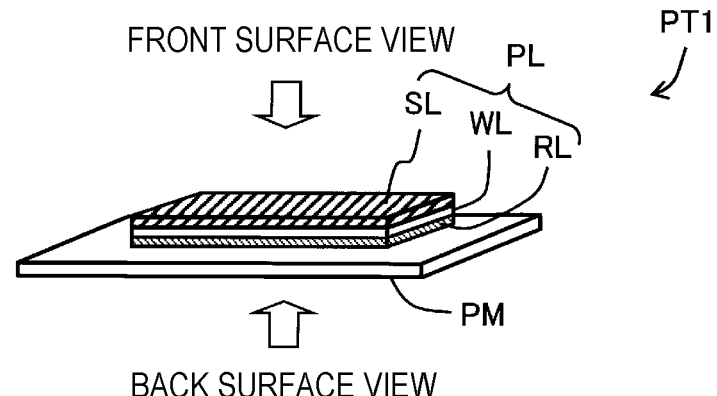
FIG. 1 is an explanatory diagram showing an example 1 of a printed object, which is printed on a transparent print medium.
Figure 1:
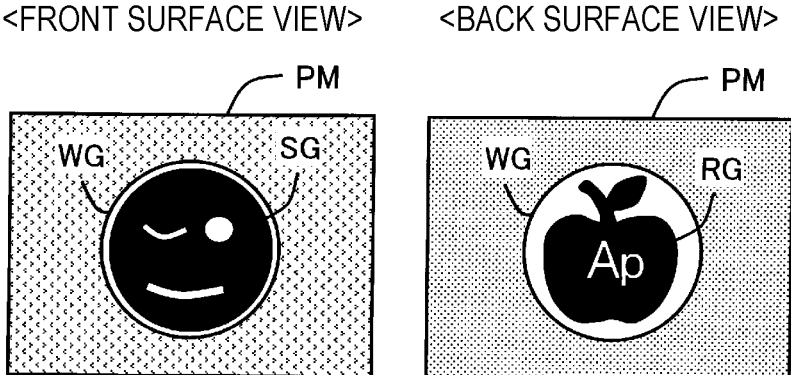
Figure 2:
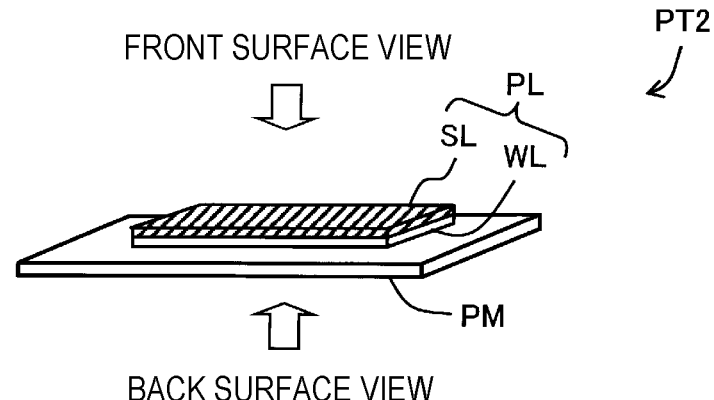
FIG. 2 is an explanatory diagram showing an example 2 of the printed object, which is printed on the transparent print medium.
Figure 2:
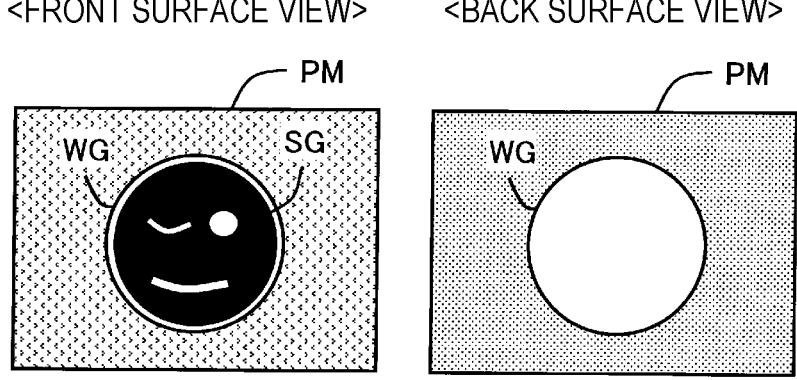

FIG. 1 is an explanatory diagram showing a first example of a printed object printed on a print medium. This printed object PT1 is a printed layer PL printed on a print medium PM. The printed layer PL includes a back surface layer RL formed with a back surface image RG observed from the back surface side, a special color layer WL formed with special color ink, and a front surface layer SL formed with a front surface image SG observed from the front surface side, stacked in this order on the front surface of the print medium PM. The thickness of each layer is exaggerated for illustrative purposes.

In this disclosure, the "front surface" of the print medium PM means a surface on which the printed layer PL is formed among the two surfaces of the print medium PM. The "front surface" of the printed object PT1 means one of the two surfaces of the printed object PT1 that includes the front surface of the print medium PM. The "back surface" is a surface opposite to the "front surface".

The print medium PM is, for example, a transparent sheet such as a transparent plastic sheet. However, the print medium PM may be translucent. The "transparent" print medium PM may have, for example, an average transmittance of 80% or more in visible light. The "translucent" print medium PM may, for example, have an average transmittance of higher than 30% and less than 80% in visible light. The following embodiments describe the process when a transparent print medium PM is used, but almost the same process can be applied when translucent print medium is used.

When the printed object PT1 is observed from the front surface side of the print medium PM, the front surface image SG is visible, and when observed from the back surface side, the back surface image RG is visible. The back surface image RG is printed on the front surface of the print medium PM as a mirror-reversed image so that it can be seen in a correct orientation when observed from the back surface side.

The special color region WG, where the special color ink is applied in the special color layer WL, is a region that includes the front surface image SG and the back surface image RG. In FIG. 1, the special color region WG is drawn as a region larger than a combined region of the front surface image SG and the back surface image RG. However, the special color region WG may be the same size as the combined region of the front surface image SG and the back surface image RG. Since the special color layer WL functions as a base for the front surface image SG and the back surface image RG, it can also be referred to as a "base layer".

As the special color ink, a white ink or a metallic color ink such as silver or gold can be used. The "special color" is a special color different from the process color of CMYK, which is used for usual color printing, and is also called a spot color. In this embodiment, white ink is used as the special color ink.

FIGS. 2 to 5 shows other examples 2 to 5 of the printed object, which is printed on the transparent print medium. The printed object PT2 in FIG. 2 has a printed layer PL in which a special color layer WL and a front surface layer SL are stacked in this order on the front surface of the transparent print medium PM. The printed object PT2 is intended to be observed only from the front surface side. Therefore, if observed from the back surface side, only the special color region WG of the special color layer WL is visible. Note that for this printed object PT2, a print medium that is transparent or translucent may be used, or a print medium that is opaque and has a colored base may be used.

Figure 3:
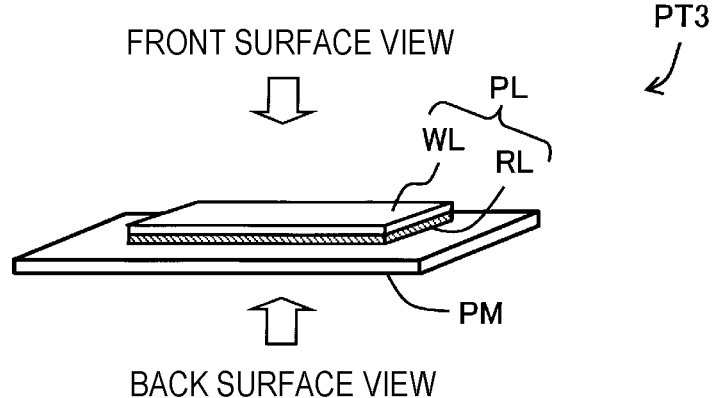
FIG. 3 is an explanatory diagram showing an example 3 of the printed object, which is printed on the transparent print medium.
Figure 3:
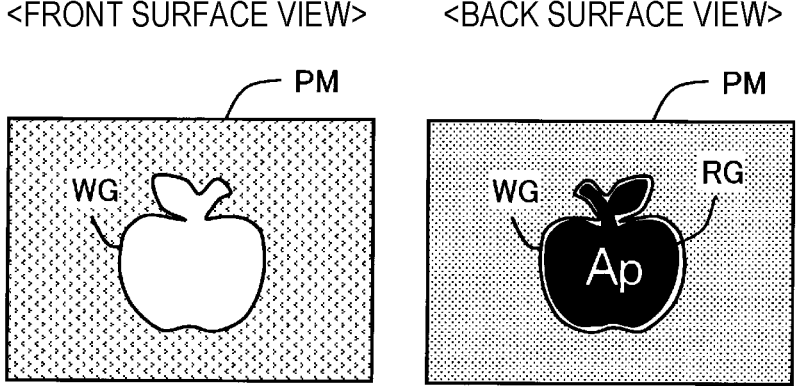

The printed object PT3 in FIG. 3 has a printed layer PL in which a back surface layer RL and a special color layer WL are stacked in this order on the front surface of the transparent print medium PM. This printed object PT3 is intended to be observed only from the back surface side. Therefore, if observed from the front surface side, only the special color region WG of the special color layer WL is visible.

Figure 4:
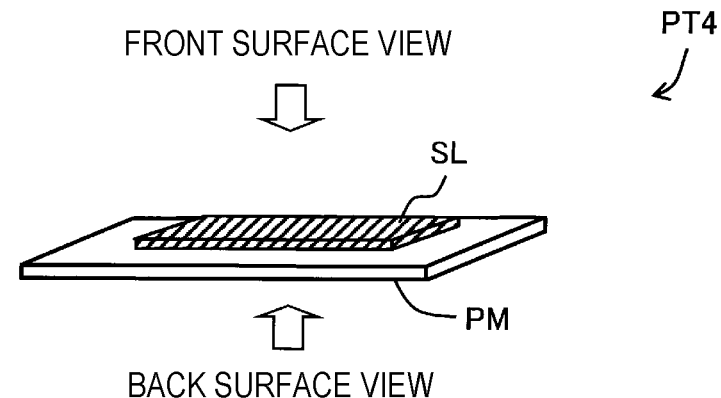
FIG. 4 is an explanatory diagram showing an example 4 of the printed object, which is printed on the transparent print medium.
Figure 4:
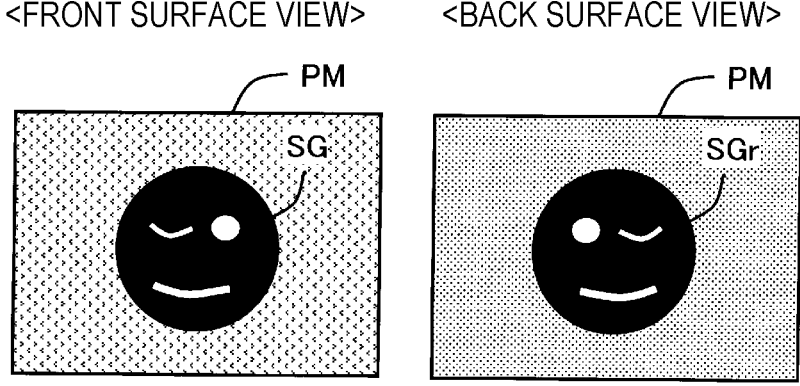

The printed object PT4 in FIG. 4 has a only the front surface layer SL as a printed layer on the front surface of the transparent print medium PM. The printed object PT4 is intended to be observed only from the front surface side. However, if observed from the back surface side, a mirror-reversed image SGr of the front surface image SG is visible.

Figure 5:
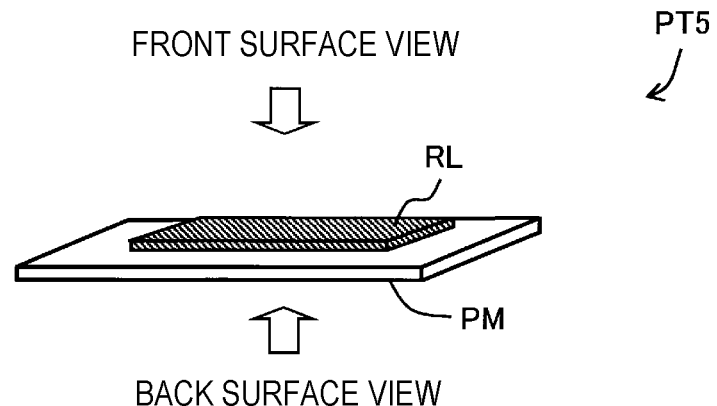
FIG. 5 is an explanatory diagram showing an example 5 of the printed object, which is printed on the transparent print medium.
Figure 5:
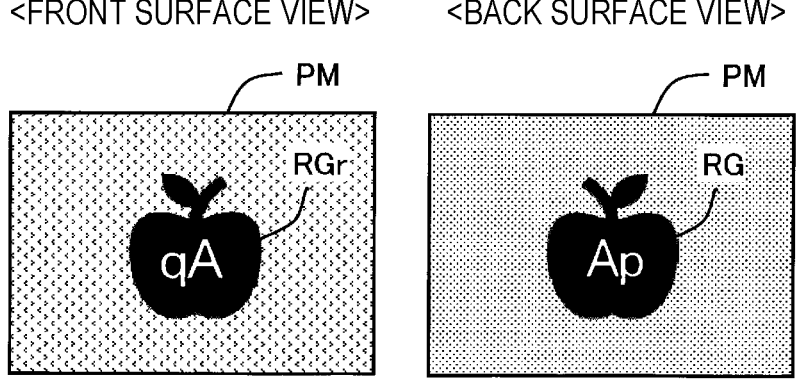

The printed object PT5 in FIG. 5 has only the back surface layer RL as a printed layer on the front surface of the transparent print medium PM. The printed object PT5 is intended to be observed only from the back surface side. However, if observed from the front surface side, a mirror-reversed image RGr of the back surface image RG is visible.

As shown in FIGS. 1 to 5, the rendering object can be any printed object in which a printed layer including at least one of a front surface layer SL and a back surface layer RL is formed on a transparent or translucent print medium PM.

The image processing device in this embodiment can generate, as rendering images, a front surface view of the printed object, which is observed from the front surface side, and a back surface view of the printed object, which is observed from the back surface side, for the printed objects PT1 to PT5 described above. The following description primarily assumes the situation of generating the front surface view and the back surface view of the printed object PT1 shown in FIG. 1.

Figure 6:
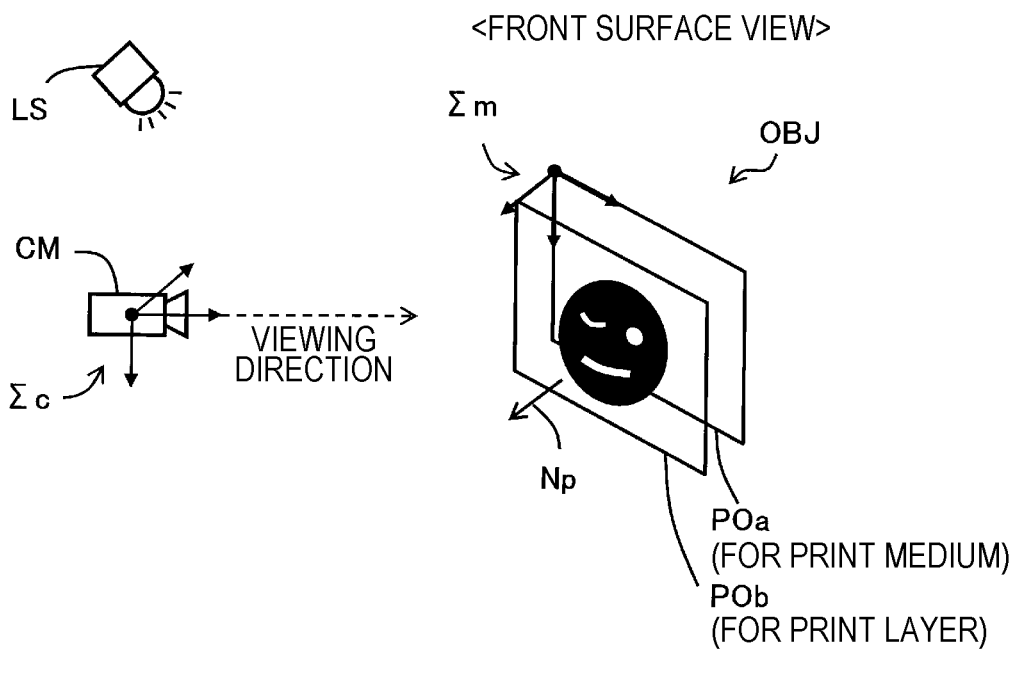
FIG. 6 is an explanatory diagram schematically showing a state in which a front surface side of the printed object is observed in a virtual space.
Figure 7:
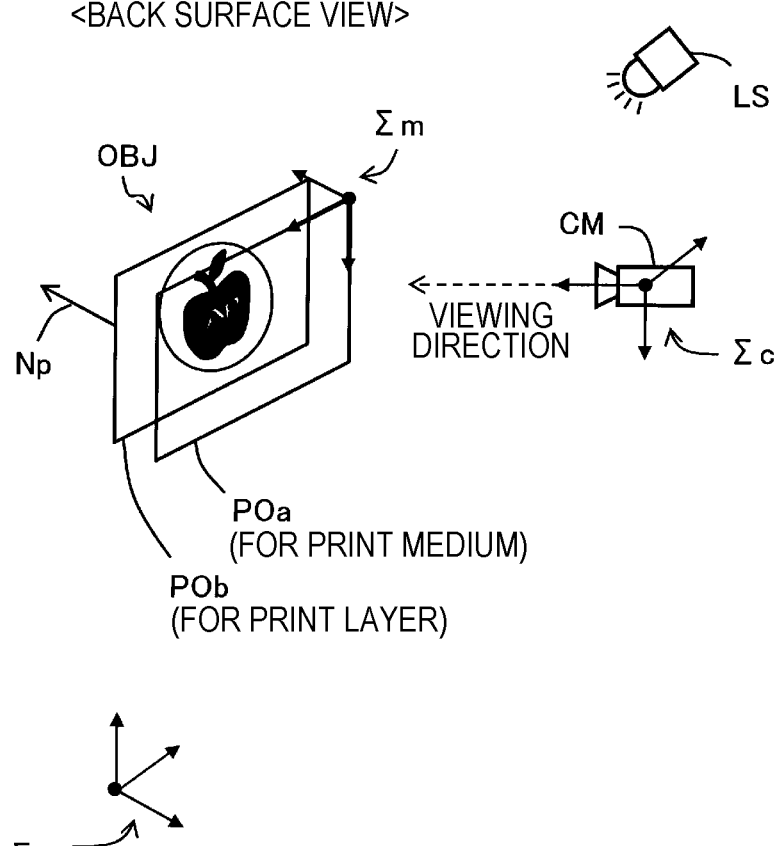
FIG. 7 is an explanatory diagram schematically showing a state in which a back surface side of the printed object is observed in the virtual space.

FIG. 6 is an explanatory view schematically showing a state in which the front surface side of the printed object is observed in virtual space, and FIG. 7 is an explanatory view schematically showing a state in which the back surface side of the printed object is observed in the virtual space. The printed object is represented as a 3-dimensional object (3D object) OBJ. The 3D object OBJ has a first polygon object POa for performing rendering with respect to the print medium PM and a second polygon object POb for performing rendering with respect to the printed layer PL. As will be described later, some of texture parameters related to the print medium PM may be applied to the second polygon object POb. The phrase "first polygon object POa for performing rendering with respect to the print medium PM" means that in the rendering using the first polygon object POa, at least the pixel values of the print medium PM are determined.

Two polygon objects POa and POb are located parallel to each other. A direction of a normal vector Np of the first polygon object POa faces toward the front surface side of the 3D object OBJ. This 3D object OBJ is illuminated by a light source LS and is captured by a camera CM. Occlusion culling is turned off for both of the polygon objects POa and POb. In other words, the 3D object OBJ is treated as a transparent object in the rendering process.

In FIGS. 6 and 7, the distance between the two polygon objects POa and POb is drawn large for convenience, but the actual distance is substantially the same as the thickness of the print medium PM.

Each of the polygon objects POa and POb may be composed of a single polygon, or may be composed of multiple small polygons (micropolygons). If the polygon object is composed of multiple micropolygons, not only a rendering image of a planar shaped printed object, but also a rendering image of a curved printed object can be easily generated.

In FIGS. 6 and 7, coordinate systems used in the rendering process are drawn as follows: a local coordinate system Σm (also called a model coordinate system), which is a 3D Cartesian coordinate system of the 3D object OBJ; a world coordinate system Σg (also called a global coordinate system), which is a 3D Cartesian coordinate system of virtual space; a view coordinate system Σc (also called a camera coordinate system), which is a 3D Cartesian coordinate system of the camera CM located in virtual space. Other coordinate systems are also used in the rendering process, such as a screen coordinate system, which is a coordinate system of a screen onto which a scene viewed from the camera CM is projected, but are omitted in FIGS. 6 and 7.

As shown in FIG. 6, with respect to a state in which a sight line direction of the camera CM is directed toward the front surface side of the 3D object OBJ, the front surface view of the 3D object OBJ observed through the camera CM is generated as the rendering image. On the other hand, as shown in FIG. 7, with respect to the state in which a sight line direction of the camera CM is directed toward the back surface side of the 3D object OBJ, the back surface view of the 3D object OBJ observed through the camera CM is generated as the rendering image.

Figure 8:
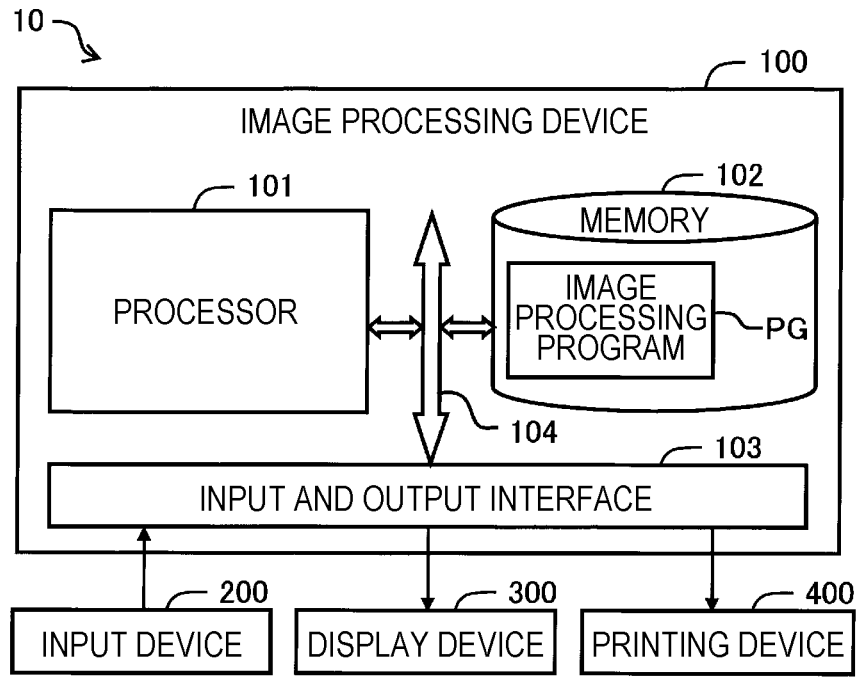
FIG. 8 is an explanatory diagram showing a configuration of a printing system.

FIG. 8 is an explanatory diagram of a printing system 10 equipped with the image processing device 100 of the first embodiment. The printing system 10 is equipped with an image processing device 100, an input device 200, a display device 300, and a printing device 400. The image processing device 100 generates a rendering image representing the printed object located in the virtual space by physical-based rendering (hereinafter, simply referred to as "rendering"), and displays the rendering image on the display device 300. The rendering image can be displayed as a preview image before the printed object is printed.

The image processing device 100 has a processor 101, a memory 102, an input and output interface 103, and an internal bus 104. The processor 101, the memory 102, and the input and output interface 103 are connected via the internal bus 104 to enable bidirectional communication. The memory 102 includes a volatile memory including a main memory and a video memory, and a nonvolatile memory such as a hard disk drive and a solid state drive (SSD). The input device 200, the display device 300, and the printing device 400 are connected to the input and output interface 103 of the image processing device 100 by wired communication or wireless communication. The input device 200 is, for example, a keyboard or a mouse, and the display device 300 is, for example, a liquid crystal display. The input device 200 and the display device 300 may be integrated as a touch panel. The printing device 400 is, for example, an inkjet printer, which prints an image on a print medium using a plurality of types of ink.

Figure 9:
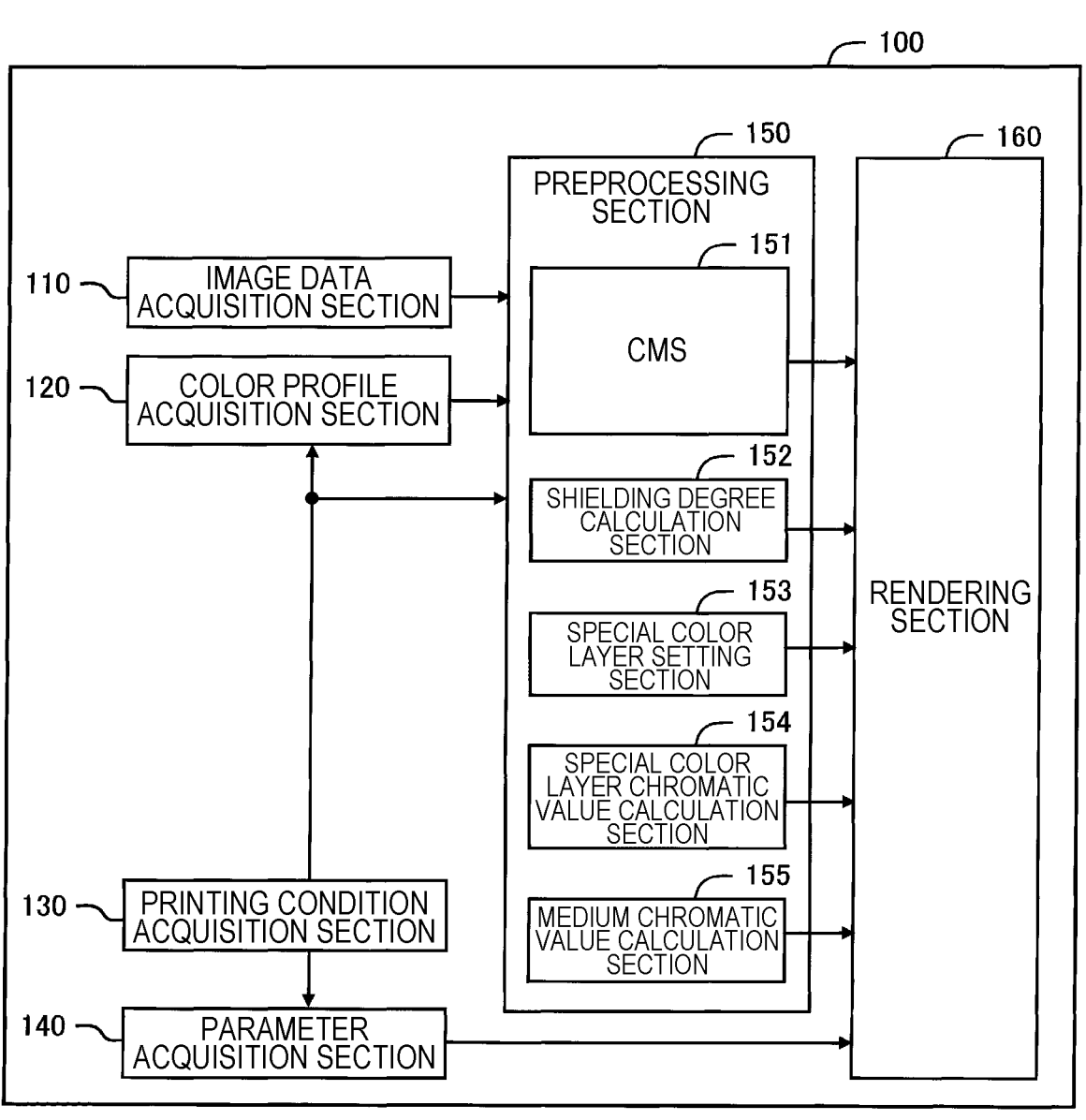
FIG. 9 is an explanatory diagram showing a configuration of an image processing device.

FIG. 9 is an explanatory diagram showing a configuration of the image processing device 100. The image processing device 100 has an image data acquisition section 110, a color profile acquisition section 120, a printing condition acquisition section 130, a parameter acquisition section 140, a preprocessing section 150, and a rendering section 160. The functions of these sections are realized in software by the processor 101, which executes an image processing program PG stored in advance in the memory 102. However, a part of the functions of each section may be realized by a hardware circuit.

The preprocessing section 150 includes a color management system 151, a shielding degree calculation section 152, a special color layer setting section 153, a special color layer chromatic value calculation section 154, and a medium chromatic value calculation section 155. The color management system 151 is also sometimes referred to as a "color conversion section".

The image data acquisition section 110 acquires input image data. In this embodiment, the input image data includes front surface image data, which represents the front surface image SG, back surface image data, which represents the back surface image RG, and data, which represents the special color region WG of the special color layer WL. The input image data acquired by the image data acquisition section 110 is sent to the preprocessing section 150.

The color profile acquisition section 120 acquires an input color profile, a media profile, and a common color space profile as color profiles used for color conversion by the color management system 151. The input profile is an ICC profile used for color conversion from input color space, which is used in the input image data, to device-independent color space. The input color space is, for example, an RGB color space. The device-independent color space is, for example, a CIE-L*a*b*(hereinafter simply described as "Lab") color space or a CIE-XYZ color space. The media profile is an ICC profile used for color conversion from the device-independent color space to device-dependent color space for the printing device 400. The device-dependent color space for the printing device 400 is, for example, a CMYK color space or an RGB color space. The color of the device-dependent color space for the printing device 400 is also referred to as a "device color". The common color space profile is an ICC profile used for color conversion from the device-independent color space to rendering color space. The rendering color space is, for example, a color space for the display device 300 such as sRGB, Adobe RGB, or Display-P3. The color profile acquisition section 120 acquires the color profiles stored in the memory 102 in advance according to the type of the printing device 400 and the display device 300. These color profiles are sent to the color management system 151. The color profile acquisition section 120 may acquire color profiles from an external server via a network.

The printing condition acquisition section 130 acquires printing conditions including a type and size of the print medium PM. In addition to the type and size of the print medium PM, the printing conditions include, for example, a resolution of print, whether or not overprinting is performed, and so on. The "type of print medium PM" is information that also indicates whether the print medium PM is transparent or translucent. The printing conditions acquired by the printing condition acquisition section 130 are sent to the color profile acquisition section 120, the parameter acquisition section 140, and the preprocessing section 150.

The parameter acquisition section 140 acquires various parameters used in the rendering. The various parameters used in rendering include, for example, 3D object information, camera information, lighting information, and texture parameters related to the texture of the printed object. The 3D object information is a parameter regarding the 3D object OBJ located in the virtual space. The camera information is a parameter regarding a position and orientation of the camera CM located in the virtual space. The lighting information is a parameter regarding a type, position, direction, color, and luminous intensity (amount of light) of the light source LS located in the virtual space. The type of the light source LS includes, for example, a fluorescent lamp or an incandescent light bulb. The texture parameter will be described later. The parameters acquired by the parameter acquisition section 140 are sent to the rendering section 160.

Figure 10:
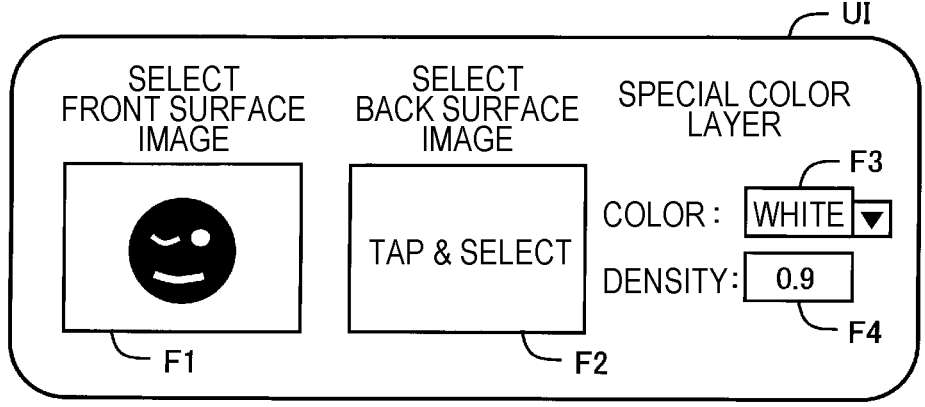
FIG. 10 is an explanatory diagram showing an example of a user interface for inputting image data.

FIG. 10 is an explanatory diagram of a user interface UI for entering the image data in the image data acquisition section 110. The user interface UI is displayed on the display device 300, for example. The user interface UI has a first input region F1 for inputting the front surface image data, a second input region F2 for inputting the back surface image data, a third input region F3 for inputting a color of the special color layer, and a fourth input region F4 for inputting density of the special color layer. The image data acquisition section 110 acquires image data selected in the first input region F1 as the front surface image data and image data selected in the second input region F2 as the back surface image data. These input regions F1 and F2, for example, are configured so that when the user taps on the input regions F1 and F2, a list of images is displayed so that the user can select any image from the list. In the example in FIG. 10, the front surface image is already selected and the back surface image is not selected yet. For the special color layer, the color and density of the special color ink can be specified in the third input region F3 and the fourth input region F4. The color of the special color ink can be selected from several special colors, including, for example, white and metallic colors such as silver and gold. The density of the special color ink can be selected, for example, with a value ranging from 0 to 1.0. "density=0" means that no special color ink is applied and "density=1.0" means that the special color ink is applied solidly. The density of the special color ink is also referred to as "duty". The special color ink may be fixed to the white ink. The density of the special color ink may also be set in advance. In this case, the third input region F3 and the fourth input region F4 are omitted.

Figure 11:
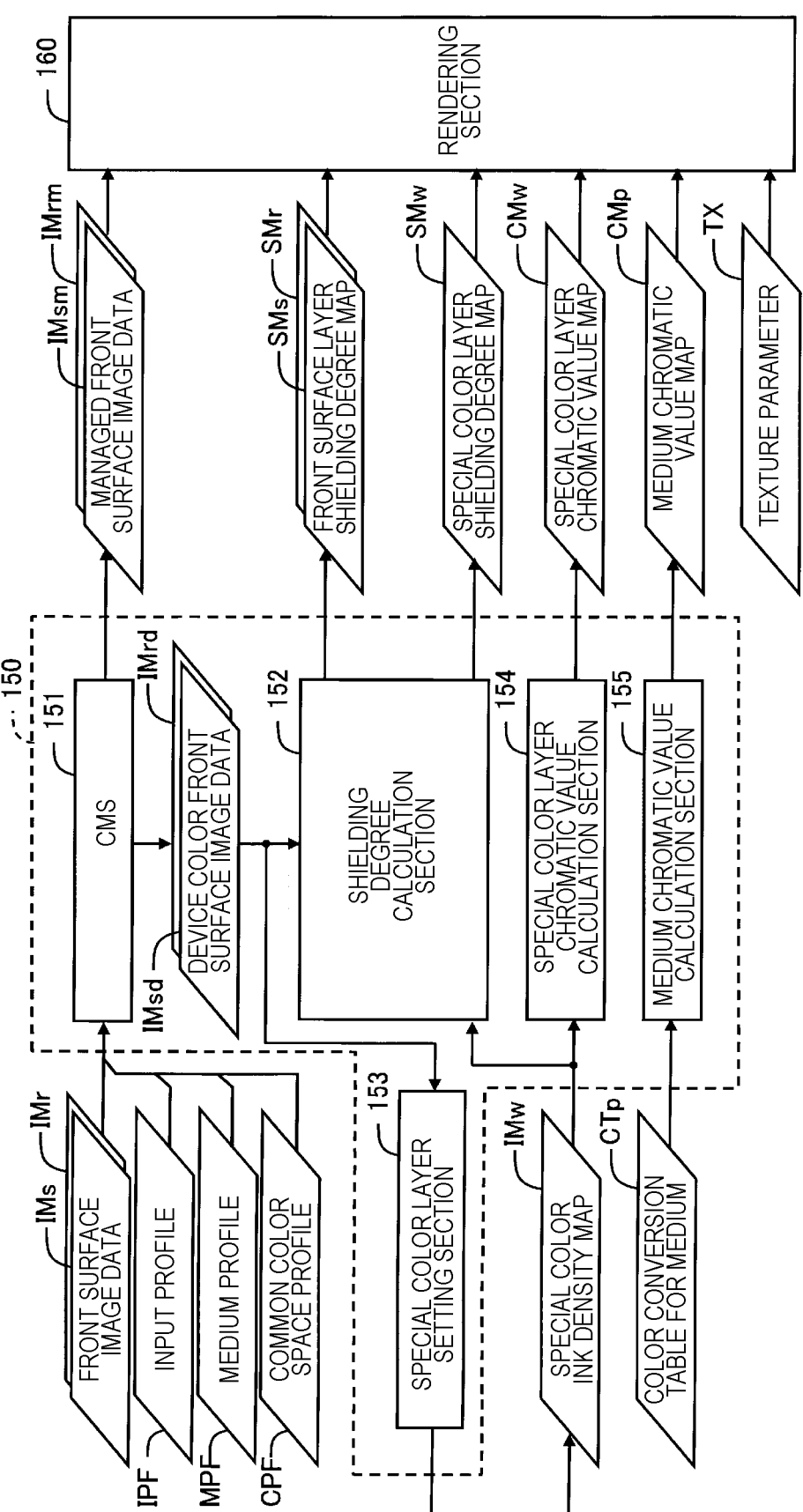
FIG. 11 is an explanatory diagram showing a function of a preprocessing section.

FIG. 11 is an explanatory diagram showing a function of the preprocessing section 150. As described above, the preprocessing section 150 includes the color management system 151, the shielding degree calculation section 152, the special color layer setting section 153, the special color layer chromatic value calculation section 154, and the medium chromatic value calculation section 155.

Figure 12:
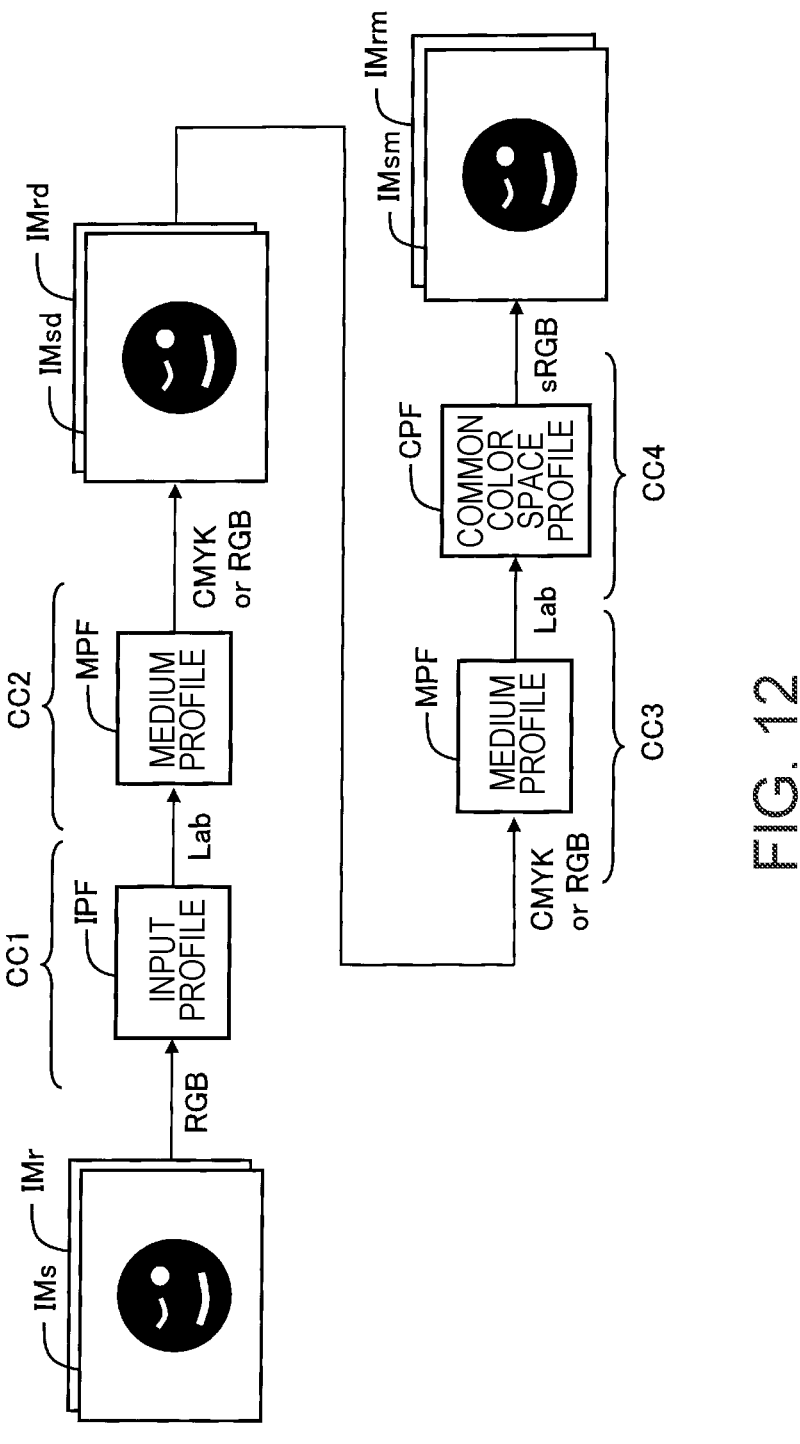
FIG. 12 is an explanatory diagram showing processing details of a color management system.

FIG. 12 is an explanatory diagram showing the processing details of the color management system 151. The color management system 151 performs the following color conversions on the front surface image data IMs and the back surface image data IMr as input image data, in order.

(1) A first color conversion CC1 from the input color space to the device-independent color space using the input profile IPF.

(2) A second color conversion CC2 from the device-independent color space to the device-dependent color space for the printing device using the media profile MPF.

(3) A third color conversion CC3 from the device-dependent color space to the device-independent color space for the printing device using the media profile MPF.

(4) A fourth color conversion CC4 from the device-independent color space to the rendering color space using the common color space profile CPF.

Instead of the input profile IPF and the media profile MPF, a device link profile, in which is combined the first color conversion CC1 and the second color conversion CC2, may be used to perform the color conversion. The color conversion using the device link profile is equivalent to a process of performing the first color conversion CC1 and the second color conversion CC2 in this order.

In the example in FIG. 12, the input color space is RGB, the device-independent color space is Lab, the device-dependent color space for the printing device is CMYK or RGB, and the rendering color space is sRGB. In the following description, image data to which the first color conversion CC1 and the second color conversion CC2 are applied are called "device color image data IMsd, IMrd", and image data to which the four color conversions CC1 to CC4 are applied are called "managed image data IMsm, IMrm". The device color image data IMsd, IMrd are sent to the shielding degree calculation section 152. The managed image data IMsm, IMrm is sent to the rendering section 160.

Figure 13:
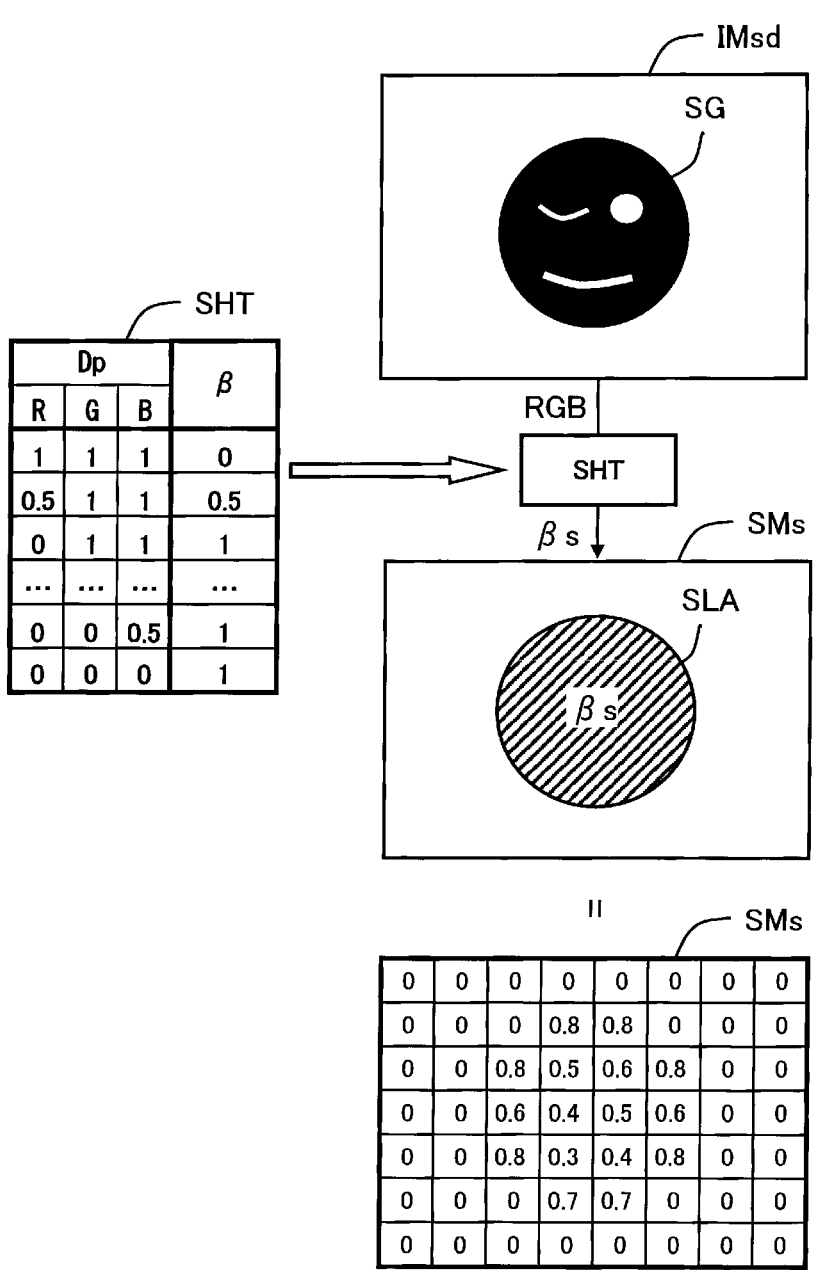
FIG. 13 is an explanatory diagram showing an example of processing details used by a shielding degree calculation section to obtain a front surface layer shielding degree map.

FIG. 13 is an explanatory diagram showing the process of obtaining the front surface layer shielding degree map SMs using the shielding degree calculation section 152. The shielding degree calculation section 152 calculates the shielding degree $\beta s$ of each pixel from the chromatic value of each pixel in the front surface image SG, which is represented by the device color front surface image data IMsd, by referring to the pre-set shielding degree conversion table SHT. In this example, the device color front surface image data IMsd is assumed to be represented in the RGB color space. The shielding degree $\beta s$ means a ratio of light shielding; $\beta s=0$ means that all light is transmitted, and $\beta s=1.0$ means that all light is blocked. Also, $(1-\beta s)$ corresponds to the transmittance degree of light. The shielding degree conversion table SHT is a look-up table in which shielding degrees for combinations of chromatic values are registered. For example, a pixel with R=G=B=1 is a pixel where no process ink is ejected, so the shielding degree is zero. Also, a pixel with R=G=B=0 is a pixel to be printed in solid black, so the shielding degree is 1.0 (=100%). The shielding degree calculation section 152 can calculate the shielding degree $\beta s$ of each pixel from the chromatic value of each pixel in the front surface image SG by executing an interpolation process if necessary. It is desirable that the number of grid points in the shielding degree conversion table SHT is greater than that in the example in FIG. 13. Similarly, for the back surface layer RL, a back surface layer shielding degree map SMr is calculated from the device color back surface image data IMrd. The shielding degree maps SMs, SMr are sent to the rendering section 160.

Figure 14:
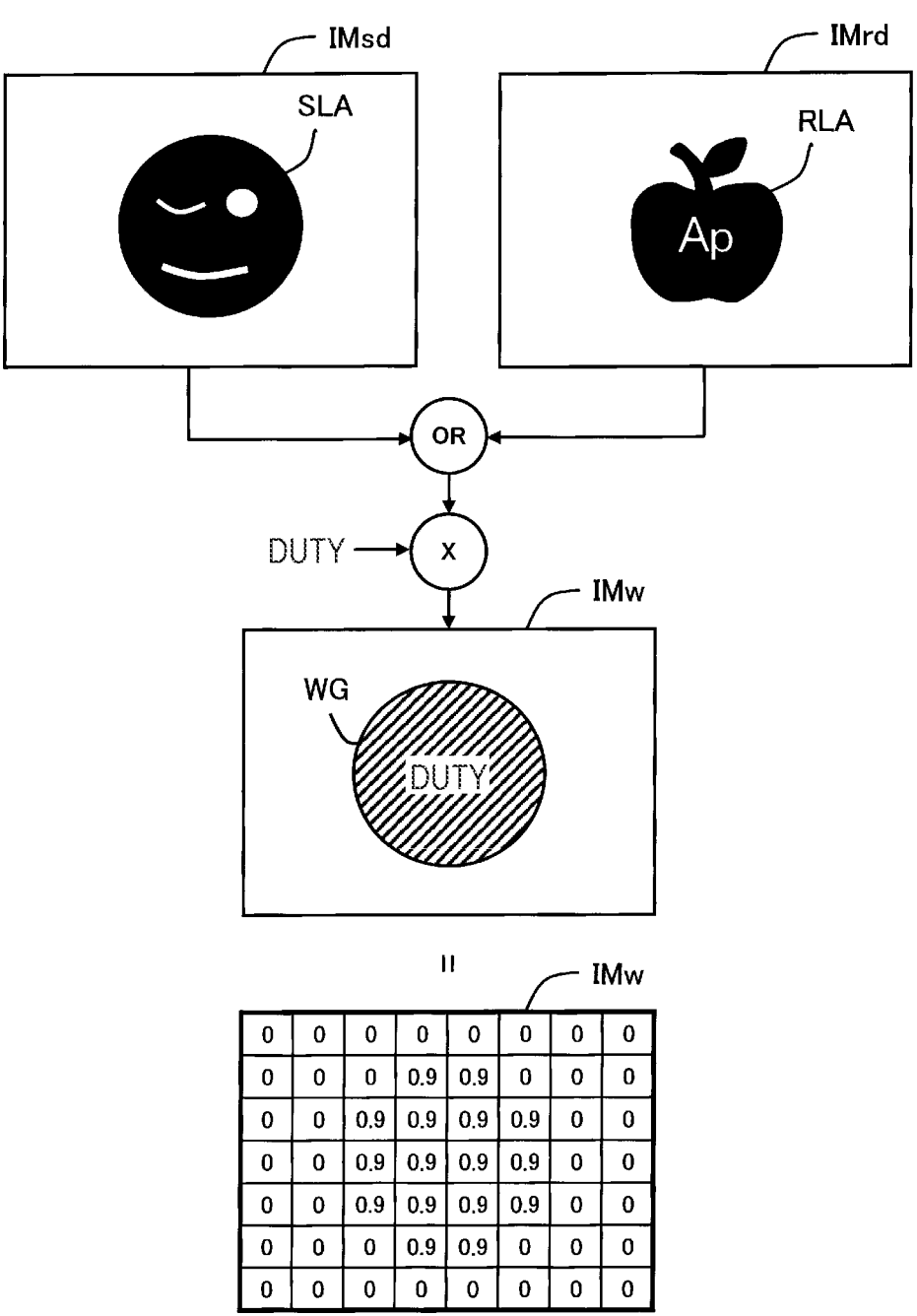
FIG. 14 is an explanatory diagram showing processing details of a special color layer setting section.

FIG. 14 is an explanatory diagram showing the processing details of the special color layer setting section 153. The special color layer setting section 153 determines an image region SLA of the front surface image, which is represented by the device color front surface image data IMsd, and an image region RLA of the back surface image, which is represented by the device color back surface image data IMrd, and then obtains the sum of these regions as the special color region WG. The image region SLA of the front surface image means a region consisting of pixels that actually have color, that is, pixels that are not R=G=B=1. The same is applied to the image region RLA of the back surface image. The special color layer setting section 153 further generates a special color ink density map IMw by assigning a special color ink density, that is, duty, to each pixel in the special color region WG. Note that instead of the device color image data IMsd, IMrd, the input image data IMs, IMr may be used to obtain the sum region of the image region SLA and the image region RLA. Further, the special color region WG may be obtained by performing an expansion process to the sum region of the image regions SLA and RLA. The special color ink density map IMw is sent to the shielding degree calculation section 152 and the special color layer chromatic value calculation section 154.

Figure 15:
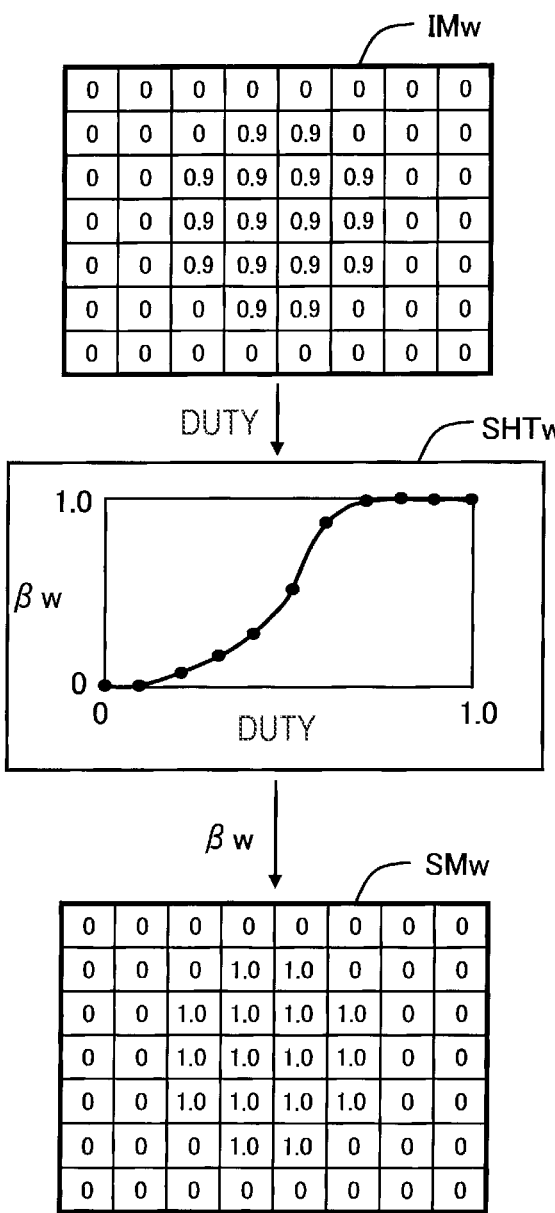
FIG. 15 is an explanatory diagram showing an example of processing details used by the shielding degree calculation section to obtain a special color layer shielding degree map.

FIG. 15 is an explanatory diagram of the processing details in which the shielding degree calculation section 152 obtains the special color layer shielding degree map SMw. The shielding degree calculation section 152 calculates the shielding degree $\beta w$ of each pixel from the special color ink density of each pixel, which is represented by the special color ink density map IMw, by referencing the shielding degree conversion table SHTw, which is preset for the special color layer. The shielding degree conversion table SHTw shows a characteristic curve in which the shielding degree $\beta w$ increases monotonically as the special color ink density increases. In the example in FIG. 15, an S-shaped characteristic curve is used, but characteristic curves with a different shape may be used. Also, a preset shielding degree $\beta w$ may be applied to each pixel in the special color region WG without the process shown in FIG. 15. The special color layer shielding degree map SMw is sent to the rendering section 160.

Figure 16:
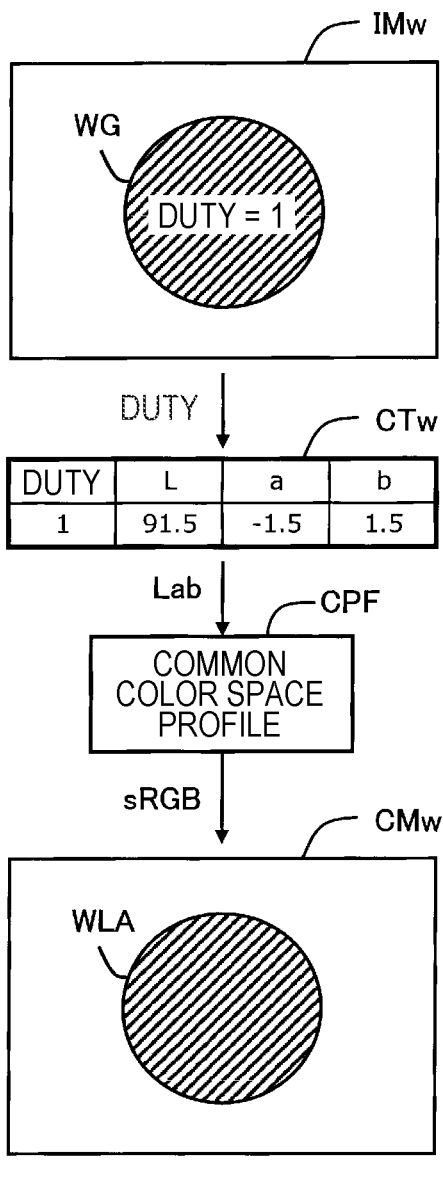
FIG. 16 is an explanatory diagram showing processing details of the special color layer chromatic value calculation section.

FIG. 16 is an explanatory diagram showing the processing details of the special color layer chromaticity value calculation section 154. The special color layer chromatic value calculation section 154 determines the Lab value of each pixel in the special color region WG, which is represented by the special color ink density map IMw, by referencing the color conversion table CTw, which is preset for the special color layer. In this case, the special color ink density of each pixel in the special color region WG is always set to the maximum value of 1.0, regardless of the special color ink density value specified in the user interface UI shown in FIG. 10. Therefore, the Lab value of each pixel in the special color region WG is set to a fixed value regardless of the special color ink density specified by the user. The special color layer chromatic value calculation section 154 further generates a special color layer chromatic value map CMw by converting the Lab values to color values in the rendering color space using the common color space profile CPF. Note that an effect of the special color ink density is taken into account by the shielding degree $\beta w$ of the special color layer WL as explained in FIG. 15, not by the special color layer chromatic value map CMw. This is because the special color layer WL is a base layer of the front surface layer SL or the back surface layer RL, and its main function is to shield light. The special color layer chromatic value map CMw is sent to the rendering section 160.

Figure 17:
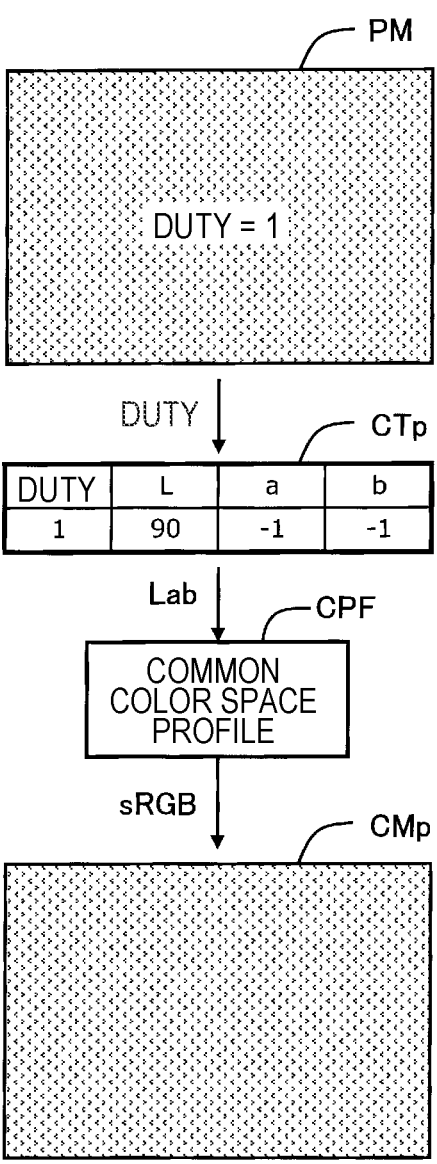
FIG. 17 is an explanatory diagram showing processing details of a medium chromatic value calculation section.

FIG. 17 is an explanatory diagram showing the processing details of the medium chromatic value calculation section 155. The medium chromatic value calculation section 155 determines the Lab value of each pixel in the print medium PM by referencing the color conversion table CTp preset for the print medium. The color conversion table CTp shows conversion characteristics according to the type of print medium specified in the printing conditions. In this case, the density, or duty, of each pixel of the print medium PM is always set at a value equal to 1.0, regardless of the type of the print medium. The medium chromatic value calculation section 155 further generates a medium chromatic value map CMp by converting the Lab values to color values in the rendering color space using the common color space profile CPF. The processing details of the medium chromatic value calculation section 155 are almost the same as those of the special color layer chromatic value calculation section 154 described in FIG. 16. The medium chromatic value map CMp is sent to the rendering section 160.

As shown in FIG. 11, in addition to the various data obtained in the processes of FIGS. 12 to 17, the rendering section 160 also receives the texture parameter TX, which represents the texture of the printed object.

The texture parameter TX includes, for example, the following parameters.

(1) Medium Shielding Degree Information

The medium shielding degree information is information that indicates the shielding degree of the print medium PM. For example, a medium shielding degree map that represents the shielding degree of the print medium PM for each pixel can be used as the medium shielding degree information. Examples of the medium shielding degree information will be described later. If the print medium PM can be regarded as almost completely transparent, the medium shielding degree information may be omitted.

(2) Base Color

The base color represents the ground color of the print medium. In this embodiment, since the medium chromatic value map CMp calculated by the medium chromatic value calculation section 155 is set as the base color, the base color does not have to be input as the texture parameter. Alternatively, instead of calculating the medium chromatic value map CMp using the medium chromatic value calculation section 155, the base color for the type of the print medium may be input as the texture parameter.

(3) Smoothness

The smoothness is a value that represents the smoothness of the print medium. The value of smoothness is specified in a range of 0 to 1, for example. Instead of the smoothness, it may include roughness, which represents the roughness of the print medium.

(4) Metallic Nature

The metallic nature is a value that expresses the metallic nature of the printed object, that is, how high is its specular reflection rate. The value of the metallic nature is specified in a range of 0 to 1, for example. When a metallic ink is used as the special color ink to form the special color layer WL, the gloss is expressed by the metallic nature of the texture parameter.

(5) Normal Map

The normal map is used to represent a micro-uneven surface (micro facet) of the print medium PM that affects the reflection of light. The normal map is a texture that represents a distribution of normal vectors of micro-uneven surface of the print medium.

(6) Height Map

The height map is also used to represent a micro-uneven surface (micro facet) of the print medium PM that affects the reflection of light. The height map is a texture that represents the distribution of the heights of the micro-uneven surface of the print medium. If the size of the polygons constituting the 3D object are made smaller to represent micro unevenness, the number of polygons becomes enormous and the computational load for rendering becomes large. By using the normal map and the height map, it is possible to represent the effect of the micro-uneven surface of the print medium on the reflection of light without reducing the polygon size.

The medium shielding degree information is applied to the first polygon object POa shown in FIGS. 6 and 7, for example, and the other texture parameters are applied to either one of the two polygon objects POa and POb. For example, the texture parameter for the front surface of the print medium PM may be applied to the second polygon object POb, and the texture parameter for the back surface of the print medium PM may be applied to the first polygon object POa. In other words, the texture parameter other than the medium shielding degree information may include a front surface texture parameter related to the front surface side of the print medium PM and a back surface texture parameter related to the back surface side of the print medium PM. Alternatively, these texture parameters may have the same value on the front surface and the back surface of the print medium PM. Note that parameters other than those described above may be used as the texture parameters.

FIG. 18 is an explanatory diagram showing an example of medium shielding degree information. The medium shielding degree map SMp defines the shielding degree Bp of each pixel of the print medium PM as a map image. The medium shielding degree map SMp is set in advance according to the type of the print medium selected in the printing condition. By using the medium shielding degree map SMp, it is possible to change the value of the shielding degree $\beta p$ for each place on the print medium PM. Instead of using the medium shielding degree map SMp, the medium shielding degree table SHp may be used to set the value of the shielding degree $\beta p$ for each type of the print medium PM. In this case, a constant value of the shielding degree $\beta p$ is assigned to the entire print medium PM. The shielding degree $\beta p$ of the print medium PM set in the medium shielding degree information is registered as alpha channel information of the polygon object POa.

The rendering section 160 performs the rendering using the various data input to the rendering section 160 in FIG. 11 and using the various parameters obtained by the parameter acquisition section 140.

The rendering section 160 can determine the pixel value Dt of the printed layer PL for each pixel for the front surface view of the printed object shown in FIGS. 1 to 5 using the following formula.

$$1 - Dt = Ks \cdot (1 - Ds) \cdot \beta s + \qquad (1)$$
$$Kw \cdot (1 - Dw) \cdot \beta w \cdot (1 - \beta s) + Kr \cdot (1 - Dr) \cdot \beta r \cdot (1 - \beta s) \cdot (1 - \beta w)$$

where

Dt is a pixel value of the printed layer PL in the rendering color space,

Ds is a chromatic value of the front surface layer SL in the rendering color space, Dw is a chromatic value of the special color layer WL in the rendering color space, Dr is a chromatic value of the back surface layer RL in the rendering color space, $\beta s$ is the shielding degree of the front surface layer SL, $\beta w$ is a shielding degree of the special color layer WL, $\beta r$ is a shielding degree of the back surface layer RL, Ks is a coefficient indicating the presence or absence of the front surface layer SL, Kw is a coefficient indicating the presence or absence of the special color layer WL, and Kr is a coefficient indicating the presence or absence of the back surface layer RL.

The coefficients Ks, Kw, Kr for the three layers SL, WL, RL are set to zero when the layer is not present and set to one when the layer is present. The formula (1) is applied to the individual color components R, G, and B in the rendering color space.

The chromatic value Ds of the front surface layer SL is a pixel value of the managed front surface image data IMsm. The chromatic value Dw of the special color layer WL is a chromatic value of the special color layer chromatic value map CMw. The chromatic value Dr of the back surface layer RL is a pixel value of the managed back surface image data IMrm.

In the front surface view of the printed object PT1 shown in FIG. 1, Ks=Kw=Kr=1. The formula (1) above can be rewritten using the transmittance degrees as and aw as follows.

$$1 - Dt = (1 - Ds) \cdot \beta s + (1 - Dw) \cdot \beta w \cdot \alpha s + (1 - Dr) \cdot \beta r \cdot \alpha s \cdot \alpha w \qquad (2)$$

where $\alpha s = (1 - s)$ and $\alpha w = (1 - \beta w)$.

The formula (2) above can be understood as follows. The left side of formula (2), $(1 - Dt)$, corresponds to the density of the complementary color, which corresponds to the pixel value Dt of the printed layer PL. For example, in the R component of the pixel value Dt, $(1 - Dt)$ corresponds to the density of the cyan component. The first term on the right side of formula (2) corresponds to a value that multiplies the density of the complementary color $(1 - Ds)$ that corresponds to the chromatic value Ds of the front surface layer SL by the shielding degree $\beta s$ of the front surface layer SL. The second term on the right side of formula (2) corresponds to a value that multiplies the density of the complementary color $(1 - Dw)$, which corresponds to the chromatic value Dw of the special color layer WL, by the shielding degree $\beta w$ of the special color layer WL and the transmittance degree $\alpha s$ of the front surface layer SL. The third term on the right side of formula (2) corresponds to a value that multiplies the density of the complementary color $(1 - Dr)$, which is corresponding to the chromatic value Dr of the back surface layer RL, by the shielding degree $\beta r$ of the back surface layer RL, the transmittance degree $\alpha s$ of the front surface layer SL, and the transmittance degree $\alpha w$ of the special color layer WL. As described above, it can be understood that formula (2) above indicates the following: it calculates, for each of the three layers, values obtained by multiplying the density of the complementary color of each layer by the shielding degree of that layer and the transmittance degree of the other layers that exist in front of that layer in the line-of-sight direction, and adds these values, to obtain the density of the complementary color $(1 - Dt)$ of each pixel in the printed layer PL. The reason why the density of the complementary color is used in the above formulas (1) and (2) instead of the color value of the rendering color space itself is that the complementary color corresponding to the chromatic value of the rendering color space corresponds to the subtractive mixture color component CMY, so the relationship using shielding degree $\beta$ and transmittance degree $\alpha = (1 - B)$ is well established.

Instead of formula (2) above, the following formula, which is a variant of formula (2), may be used.

$$Dt = 1 - \{(1 - Ds)\cdot\beta s + (1 - Dw)\cdot\beta w\cdot(1 - \beta s) + (1 - Dr)\cdot\beta r\cdot \qquad (3)$$

$$(1 - \beta s)\cdot(1 - \beta w)\}$$

$$= 1 - \{(1 - Ds)\cdot\beta s + (1 - Dw)\cdot\beta w\cdot\alpha s + (1 - Dr)\cdot\beta r\cdot\alpha s\cdot\alpha w\}$$

Further, for the back surface view of the printed object shown in FIGS. 1 to 5, the rendering section 160 can determine the pixel value Dt representing the printed layer PL using the following formula, which is similar to the formula (1) above.

$$1 - Dt = Kr\cdot(1 - Dr)\cdot\beta r + \qquad (4)$$

$$Kw\cdot(1 - Dw)\cdot\beta w\cdot(1 - \beta r) + Ks\cdot(1 - Ds)\cdot\beta s\cdot(1 - \beta r)\cdot(1 - \beta w)$$

For the back surface view of the printed object PT1 shown in FIG. 1, the formula (4) above can be rewritten as $$Dt = 1 - \{(1 - Dr)\cdot\beta r + (1 - Dw)\cdot\beta w\cdot(1 - \beta r) + (1 - Ds)\cdot\beta s\cdot \qquad (5)$$

$$(1 - \beta r)\cdot(1 - \beta w)\}$$

$$= 1 - \{(1 - Dr)\cdot\beta r + (1 - Dw)\cdot\beta w\cdot\alpha r + (1 - Ds)\cdot\beta s\cdot\alpha r\cdot\alpha w\}$$

The rendering section 160 can further calculate the shielding degree $\beta t$ of the printed layer PL by the following formula.

$$\beta t = 1 - (1 - \beta s)\cdot(1 - \beta w)\cdot(1 - \beta r) \qquad (6)$$

The shielding degree $\beta t$ of the printed layer PL can be used to generate both the front surface view and the back surface view. The shielding degree $\beta t$ of the printed layer PL is registered as alpha channel information of the second polygon object POb for the printed layer PL, and is applied to the transparency reflection process in the render backend described later.

Figure 19:
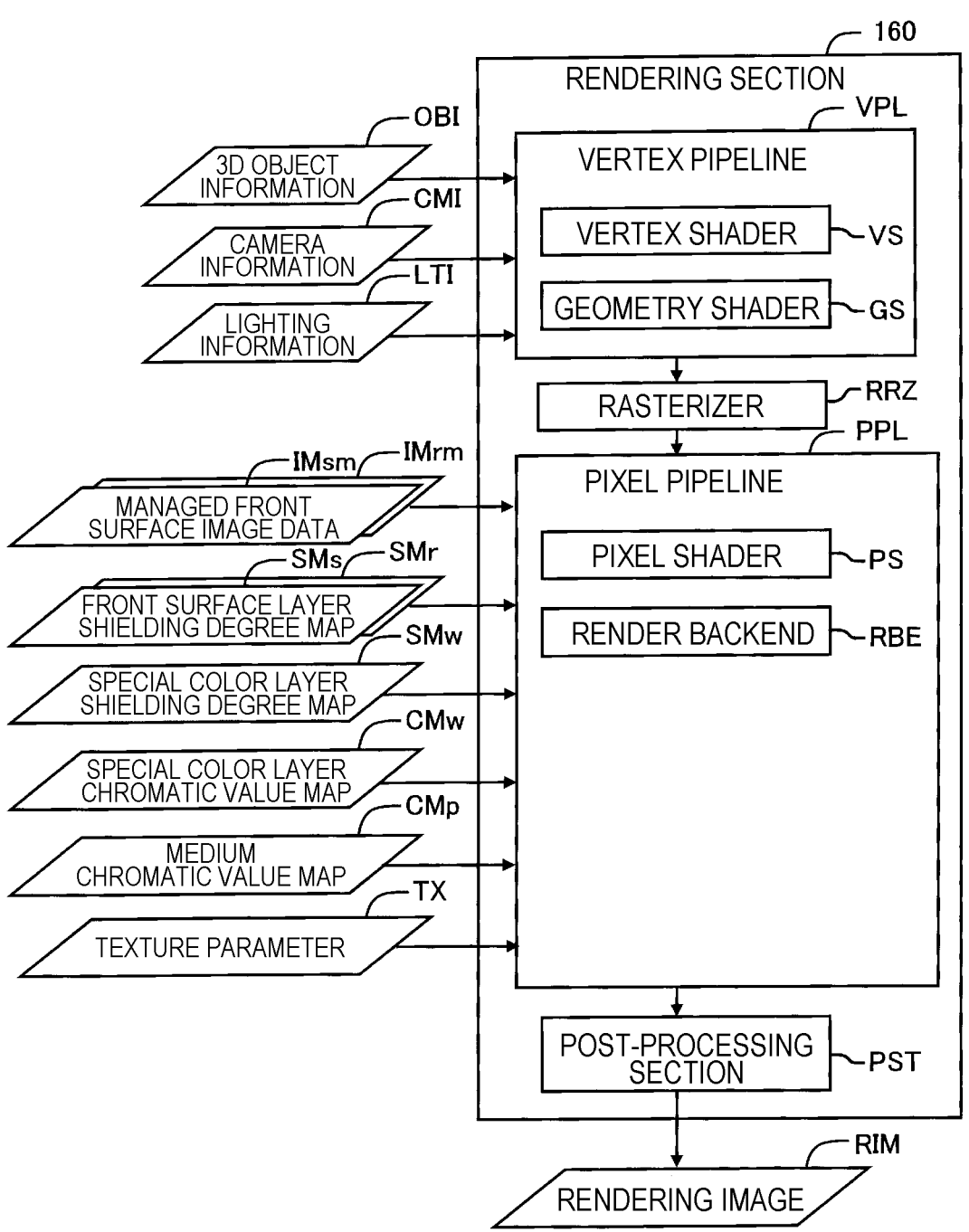
FIG. 19 is an explanatory diagram showing the configuration of a rendering section.

FIG. 19 is an explanatory diagram showing the configuration of the rendering section 160. The rendering section 160 has a vertex pipeline VPL, a rasterizer RRZ, a pixel pipeline PPL, and a post-processing section PST. In this embodiment, the vertex pipeline VPL has a vertex shader VS and a geometry shader GS, and the pixel pipeline PPL has a pixel shader PS and a render backend RBE.

The vertex shader VS performs a process on the polygons that comprise the 3D object OBJ using the 3D object information OBI, camera information CMI, and lighting information LTI. This process includes coordinate transformation of the vertices of each polygon that comprises the 3D object OBJ, calculation of the normal vectors of each polygon, shading processing, and calculation of the texture mapping coordinates (UV coordinates). The coordinate transformation includes model transformation, which is the coordinate transformation from the local coordinate system $\Sigma m$ of the 3D object OBJ to the world coordinate system $\Sigma g$, view transformation, which is the coordinate transformation from the world coordinate system $\Sigma g$ to the view coordinate system $\Sigma c$, and projection transformation, which is the coordinate transformation from the view coordinate system $\Sigma c$ to the screen coordinate system. Some of the coordinate transformations described above may be performed by the geometry shader GS. The processing result of the vertex shader VS is sent to the geometry shader GS.

The geometry shader GS processes a set of vertices of the 3D object. The geometry shader GS can convert polygons to points or lines, or convert points or lines to polygons, by increasing or decreasing the number of vertices. The processing result of the geometry shader GS is sent to the rasterizer RRZ. Note that, in another embodiment, the rendering section 160 may not be provided with the geometry shader GS. In this case, the processing result of the vertex shader VS is sent to the rasterizer RRZ.

The rasterizer RRZ performs a rasterization process to generate drawing information for each pixel from the processing results of the vertex pipeline VPL. The processing result of the rasterizer RRZ is sent to the pixel shader PS.

The pixel shader PS determines pixel colors of the front and back surfaces of polygon objects POa and POb corresponding to each pixel by performing the lighting process using rasterized 3D objects, image data, and texture parameters. In this embodiment, the front surface of the 3D object is composed of the front surface of the second polygon object POb, and the back surface of the 3D object is composed of the front surface of the first polygon object POa. The pixel shader PS performs the lighting process by mapping front surface texture parameters to the second polygon object POb, and mapping the back surface texture parameters to the first polygon object POa. For example, the Disney Principled BRDF can be used as a function to calculate the reflection of light in the lighting process. In this embodiment, the rendering section 160 has a back culling function that excludes the polygon, whose back surface is facing the camera, from the drawing target. If the rendering section 160 has the back culling function, the rendering section 160 performs the process with the back face culling function turned off. Therefore, the back surface of each polygon within the camera's field of view is not excluded from the drawing target. The processing result of the pixel shader PS is sent to the render backend RBE.

The render backend RBE decides whether to write the pixel data generated by the pixel shader PS into the display region of the memory 102. If the render backend RBE determines to write into the memory 102, the pixel data is saved as the drawing target and if the render backend RBE does not determine to write into the memory 102, the pixel data is not saved as the drawing target. For example, an alpha test, a depth test, a stencil test, or the like is used to determine whether or not to write. In this embodiment, the pixel data includes color information of the second polygon object POb and color information of the first polygon object POa. When generating the front surface view, for example, using the depth sorting method, the render backend RBE writes from the color of the polygon object POa, which is the far side from the camera. After writing the color of the polygon object POa, which is in the far side, when writing the color of the front side polygon object POb, for example, the render backend RBE will combine the color of the far side polygon with the color of the front side polygon according to the transmittance degree of the front side polygon object POb by using alpha blending. If the transmittance degree is zero, when writing the color of the front side polygon object POb, the color of the far side polygon object POa is overwritten by the color of the front side polygon object POb. This process of writing into the display region is also referred to as a "drawing process". When the pixel data is written into the memory 102, the pipeline process ends.

The post-processing section PST performs post-processing, such as anti-aliasing, ambient occlusion, screen space reflection, and depth of field processing, on the rendering image consisting of pixel data stored in memory 102 so as to improve the appearance of the rendering image RIM.

Figure 20:
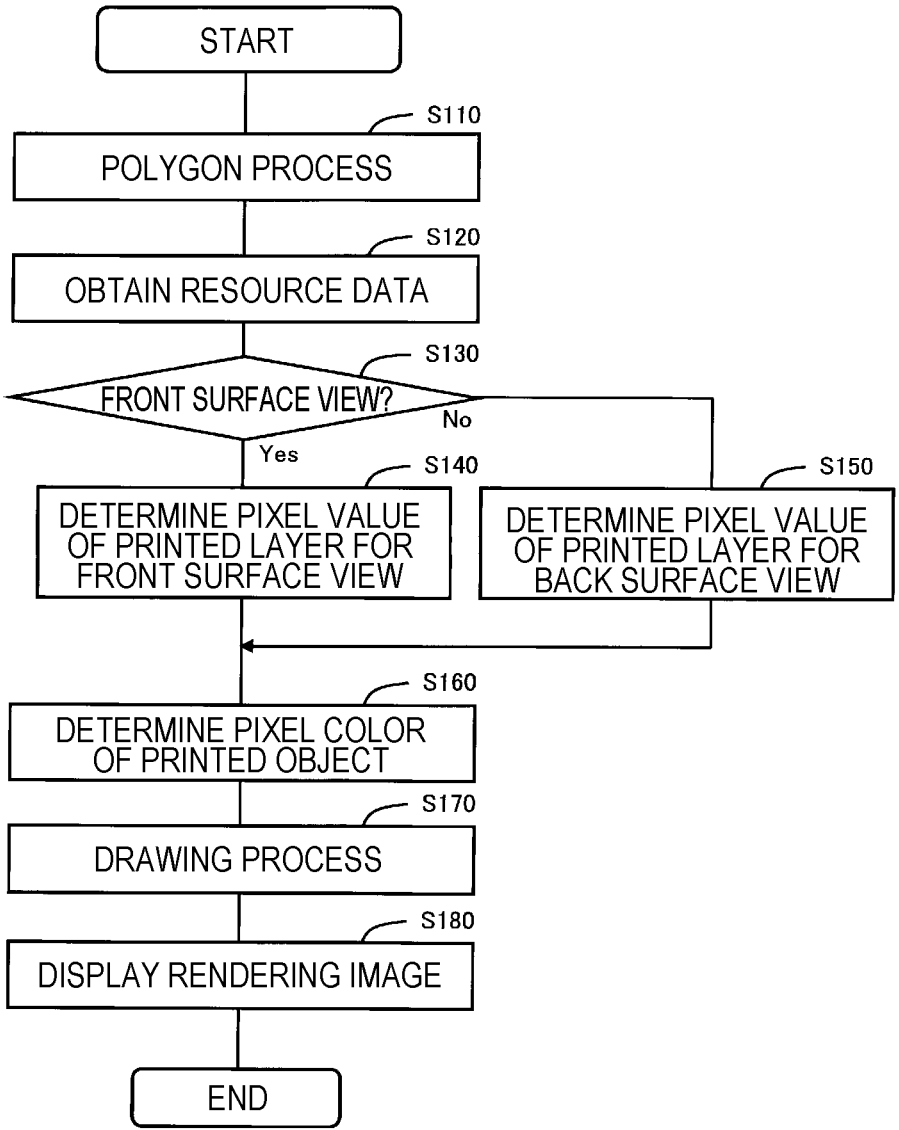
FIG. 20 is a flowchart showing a process of the rendering section.

FIG. 20 is a flowchart showing the process of the rendering section 160. In step S110, the vertex pipeline VPL performs processing of the polygon objects POa and POb that comprise the 3D object OBJ.

In steps S120 to S160, the pixel shader PS determines the pixel colors in the rendering image. In step S120, the pixel shader PS obtains resource data. The resource data includes the managed image data IMsm, IMrm for the front and back surface images, the shielding degree maps SMs, SMr, and SMw for the front, back and special color layers, the special color layer chromatic value map CMw, the medium chromatic value map CMp, and the texture parameter TX. Note that the medium chromatic value map CMp is applied as the base color of the first polygon object POa. The medium shielding degree information included in the texture parameter TX is registered as the alpha channel information of the first polygon object POa.

In step S130, the pixel shader PS determines whether the front surface view or the back surface view should be generated as the rendering image. When generating the front surface view, the process proceeds to step S140 and the pixel shader PS determines the pixel value of the printed layer PL for the front surface view. Specifically, the pixel value Dt is calculated according to formulas (1) and (3) described above. On the other hand, when generating the back surface view, the process proceeds to step S150 and the pixel shader PS determines the pixel value of the printed layer PL for the back surface view. In other words, the pixel value Dt is calculated according to formulas (4) or (5) described above.

In step S160, the pixel shader PS determines the pixel colors of the rendering image by performing a lighting process using the pixel values determined in step S140 or step S150 and the texture parameters.

In step S170, the render backend RBE performs a drawing process on the pixel data generated by the pixel shader PS, and writes the processed pixel data as the rendering image into the display region of the memory 102. In the drawing process, for the first polygon object POa for the print medium PM, the alpha blend process is performed using the shielding degree $\beta p$ of the print medium PM registered as the alpha channel information of the first polygon object POa. For the second polygon object POb for the printed layer PL, the alpha blend process is performed using the shielding degree $\beta t$ of the printed layer PL registered as the alpha channel information of the second polygon object POb.

In step S180, the generated rendering image is displayed on the display device 300. Note that only one of the front surface view and the back surface view may be selectively displayed, or both may be displayed at the same time, depending on the user's instructions. When both front surface view and the back surface view are displayed at the same time, both steps S140 and S150 are performed.

According to the first embodiment described above, the rendering is performed using the shielding degree of the printed layer PL. Therefore, the printed object in which a printed layer PL is formed on the transparent or translucent print medium PM can be reproduced without incongruity in the way it looks in real space. Further, since the texture of the printed object can be expressed, it is possible to create a realistic rendering image that can show the texture.

Further, in the first embodiment, the print medium PM and the printed layer PL are represented by separate polygonal objects. Therefore, the appearance of the printed object can be reproduced with a realistic texture. Further, by performing the rendering in real time, a preview can be displayed before printing by the printing device. Further, the processing load for the initial preview display can be reduced, which has an advantage that the initial preview display can be performed in a shorter time.

B. Second Embodiment

Figure 21:
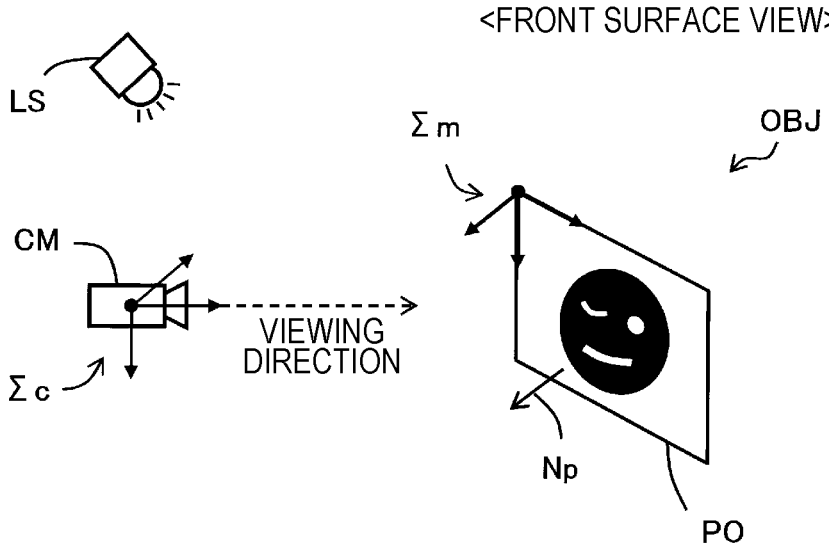
FIG. 21 is an explanatory diagram schematically showing a state in which the front surface side of the printed object is observed in a second embodiment.
Figure 21:
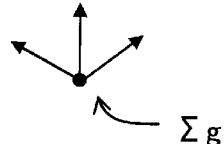
Figure 22:
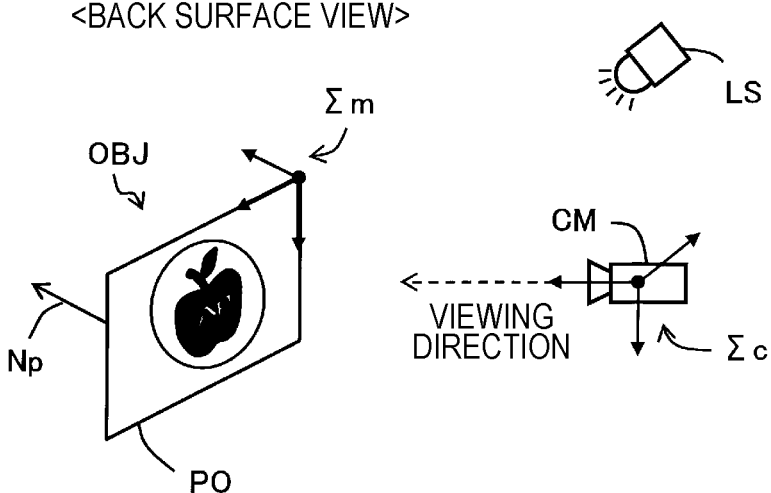
FIG. 22 is an explanatory diagram schematically showing a state in which the back surface side of the printed object is observed in the second embodiment.
Figure 22:
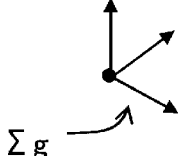

FIG. 21 is an explanatory diagram schematically showing how the front surface of the 3D object OBJ is observed in a second embodiment. FIG. 22 is an explanatory diagram schematically showing how the back surface of the 3D object OBJ is observed in the second embodiment. The second embodiment is different from the first embodiment in that the 3D object OBJ composed of a single polygon object PO is used for the rendering. The other configurations are the same as those of the first embodiment unless otherwise described.

In the second embodiment, a single polygon object PO constitutes the front surface of the 3D object OBJ and also constitutes the back surface of the 3D object OBJ. That is, if the side toward which the normal vector Np of polygon object PO faces is the front surface of polygon object PO, the front surface of polygon object PO constitutes the front surface of 3D object OBJ, and the back surface of polygon object PO constitutes the back surface of 3D object OBJ. The polygon object PO can be configured to have a plate-like shape with no thickness.

In the second embodiment, the rendering section 160 can determine the pixel value Dpt of the front surface view of the printed object, which includes the print medium PM and the printed layer PL, using the following formula.

$$Dpt = 1 - \{(1 - Dt) + (1 - Dp) \cdot \beta p \cdot (1 - \beta t)\} \qquad (7)$$

where Dt is the pixel value of the printed layer PL, Dp is the chromatic value of the print medium PM, Bp is the shielding degree of the print medium PM, and $\beta t$ is the shielding degree of the printed layer PL.

The pixel value Dt of the printed layer PL is calculated by using any one of formulas (1) to (3) described above. The chromatic value Dp of the print medium PM is the pixel value of the medium chromatic value map CMp described in FIG. 17. The shielding degree $\beta t$ of the printed layer PL is calculated using formula (6) described above.

The rendering section 160 can further determine the pixel value Dpt of the back surface view of the printed object, which includes the print medium PM and the printed layer PL, using a following formula.

$$Dpt = 1 - \{(1 - Dp) + (1 - Dt) \cdot \beta t \cdot (1 - \beta p)\} \qquad (8)$$

where the pixel value Dt of the printed layer PL is calculated by using any one of formulas (4) and (5) described above.

The shielding degree $\beta pt$ of the entire printed object is calculated using the following formula.

$$\beta pt = 1 - (1 - \beta t) \cdot (1 - \beta p) \qquad (9)$$

where $\beta t$ is the shielding degree of the printed layer PL, and Bp is the shielding degree of the print medium PM. The shielding degree $\beta t$ of the printed layer PL is obtained using formula (6) described above.

Note that the shielding degree $\beta pt$ for the entire printed object is defined in the range $0 \leq \beta pt \leq 1$. Therefore, if the shielding degree $\beta pt$ is out of this range, it is clipped at the boundary value of 0 or 1. The shielding degree $\beta pt$ of the entire printed object is registered as the alpha channel information of the polygon object PO, and is used for drawing process in the render backend RBE.

According to the second embodiment described above, it is possible to obtain substantially the same effects as those of the first embodiment. The second embodiment can represent the printed object with a realistic texture using a single polygon object PO.

C. Other Embodiments

C1. In the image processing device 100 of each of the above embodiments, the texture parameters other than the medium shielding degree include the front surface texture parameter and the back surface image texture parameter, and the rendering section 160 performs rendering by mapping the front surface texture parameter to the front surface of the 3D object and by mapping the back surface texture parameter to the back surface of the 3D object. However, there is no need to separate the texture parameters for the front surface and for the back surface. In this case, the rendering section 160 may perform the rendering by mapping the same texture parameters to the front surface and back surface of the 3D object.

C2. The image processing device 100 in each of the above mentioned embodiments generates the rendering image representing the print medium on which an image is directly printed by a printing device such as an inkjet printer. On the other hand, the image processing device 100 may, for example, generate the rendering image representing a medium to which an image is transferred by thermal transfer from a transfer paper on which the image has been printed by the printing device. In this case, the medium to which the image is transferred by thermal transfer from the transfer paper is called the print medium.

D. Other Aspects

This disclosure is not limited to the embodiments described above, but can be realized in various aspects to the extent that the intent is not departed from. For example, this disclosure can also be realized by the following aspects. The technical features in the above embodiments that correspond to the technical features in each of the aspects described below may be replaced or combined as appropriate to solve some or all of the problems in this disclosure or to achieve some or all of the effects of this disclosure. If the technical features are not described as essential in this specification, the technical features can be deleted as appropriate.

(1) According to the first aspect of this disclosure, an image processing device is provided. This image processing device includes an image data acquisition section that acquires image data; a printing condition acquisition section that acquires a printing condition including a type of a print medium; a color conversion section that performs color conversion on the image data according to the printing condition; a shielding degree calculation section that calculates a shielding degree of a printed layer for a printed object, wherein the printed layer is formed on the front surface of the print medium, which is transparent or translucent; and a rendering section that generates a rendering image, which represents the printed object, by performing rendering on the 3-dimensional object, which represents the shape of the print medium, by mapping the image data on which the color conversion was performed. The rendering section generates at least one of a front surface view of the printed object, which is observed from a front surface side, and a back surface view of the printed object, which is observed from a back surface side, by performing the rendering using the shielding degree of the printed layer. According to this image processing device, since the rendering is performed using the shielding degree of the printed layer, it is possible to reproduce the appearance in the real space of the printed object in which the printed layer is formed on the transparent or translucent print medium without discomfort.

(2) The above image processing device may be configured such that the image processing device further includes a parameter acquisition section that acquires a texture parameter representing a texture of the print medium, wherein the rendering section performs the rendering by mapping the texture parameter to the 3-dimensional object.

According to this method, the texture of the printed object is expressed, so the realistic rendering image with the texture can be created.

(3) The above image processing device may be configured such that the texture parameter includes medium shielding degree information that indicates a shielding degree of the print medium. According to this image processing device, since the texture of the printed object is expressed by the texture parameter including the medium shielding degree information, it is possible to create a realistic rendering image.

(4) The above image processing device may be configured such that the printed object is a first printed object on which a first printed layer is formed, the first printed layer including a back surface layer, which is a back surface image observed from the back surface side, a special color layer, which is formed with a special color ink, and a front surface layer, which is a front surface image observed from the front surface side, in this order, on the front surface of the print medium, wherein the shielding degree calculation section calculates the shielding degrees of the back surface layer, the special color layer, and the front surface layer, and the rendering section generates at least one of a first front surface view of the first printed object observed from the front surface side and a first back surface view of the first printed object observed from the back surface side, by performing the rendering using the shielding degrees of the back surface layer, the special color layer, and the front surface layer.

According to this image processing device, the appearance in the real space can be reproduced in the virtual space for the printed object, where three printed layers are formed on the transparent or translucent print medium.

(5) The above image processing device may be configured such that the printed object is a second printed object on which a second printed layer is formed, the second printed object including a special color layer, which is formed with a special color ink, and a front surface layer, which is a front surface image observed from the front surface side, in this order, on the front surface of the print medium, wherein the shielding degree calculation section calculates the shielding degrees of the special color layer and the front surface layer, and the rendering section generates at least one of a second front surface view of the second printed object, which is observed from the front surface side, and a second back surface view of the second printed object, which is observed from the back surface side, by performing the rendering using the shielding degrees of the special color layer and the front surface layer.

According to this image processing device, the appearance in the real space can be reproduced in the virtual space for the printed object, where two printed layers are formed on the print medium. Note that the second printed object may be formed using a print medium that is transparent or translucent, or that is opaque and have a colored base.

(6) The above image processing device may be configured such that the printed object is a third printed object on which a third printed layer is formed, the third printed layer including a back surface layer, which is a back surface image observed from the back surface side, and a special color layer, which is formed with a special color ink, in this order, on the front surface of the print medium, wherein the shielding degree calculation section calculates the shielding degrees of the back surface layer and the special color layer, and the rendering section generates at least one of a third front surface view of the third printed object observed from the front surface side and a third back surface view of the third printed object observed from the back surface side, by performing the rendering using the shielding degrees of the back surface layer and the special color layer.

According to this image processing device, the appearance in the real space can be reproduced in the virtual space for the printed object, where two printed layers are formed on the transparent or translucent print medium.

(7) The above image processing device may be configured such that the color conversion section converts input image data to managed image data by performing a first color conversion from an input color space to a device-independent color space using an input profile, a second color conversion from the device-independent color space to a device-dependent color space for a printing device using an media profile, a third color conversion from the device-dependent color space to the device-independent color space using the media profile, and a fourth color conversion from the device-independent color space to a rendering color space using an common color space profile in that order, and the rendering section performs the rendering using the managed image data.

According to this image processing device, since the input color space is converted to the device-dependent color space for the printing device via the device-independent space, and then converted again to the device-independent color space, and further converted to the rendering color space. Therefore, the color close to the actual printed object can be reproduced.

(8) The above image processing device may be configured such that the shielding degree calculation section calculates the shielding degree of the printed layer for each pixel using device color image data obtained by performing the first color conversion and the second color conversion.

According to this image processing device, the shielding degree of the printed layer can be calculated from the device color image data.

(9) The above image processing device may be configured such that the 3-dimensional object is comprised of a first polygon object and a second polygon object, which are located parallel to each other and the rendering section performs the rendering for the print medium using the first polygon object, and performs the rendering for the printed layer using the second polygon object.

According to this image processing device, the print medium and the printed layer are represented by separate polygon objects, so the appearance of the printed object can be reproduced with a realistic texture.

(10) The above image processing device may be configured such that the 3-dimensional object is comprised of a single polygon object and the rendering section performs the rendering for the printed object, which includes the print medium and the printed layer, using the polygon object.

According to this image processing device, the appearance of the printed object can be reproduced with a realistic texture using the single polygon object.

(11) According to the second aspect of this disclosure, a printing system is provided. This printing system includes the image processing device according to the above first aspect a display device that displays the rendering image generated by the image processing device; and a printing device that prints the printed object.

According to this printing system, a printed object printed by a printing device can be previewed on a display device using the rendering image generated by the image processing device.

(12) According to a third aspect of this disclosure, a non-transitory computer-readable recording medium having stored therein image processing program is provided. This non-transitory computer-readable recording medium having stored therein the image processing program causes a computer to perform: an image data acquisition function that acquires image data; a printing condition acquisition function that acquires a printing condition including a type of a print medium; a color conversion function that performs color conversion on the image data according to the printing condition; a shielding degree calculation function that calculates a shielding degree of a printed layer, with respect to a printed object in which the printed layer is formed on the front surface of the print medium, which is transparent or translucent; and a rendering function that generates a rendering image, which represents the printed object, by performing rendering on the 3-dimensional object, which represents the shape of the print medium, by mapping the image data on which the color conversion was performed, wherein the rendering function includes a function to generate at least one of a front surface view of the printed object observed from a front surface side and a back surface view of the printed object observed from a back surface side, by performing the rendering using the shielding degree of the printed layer.

This disclosure can also be realized in various aspects other than the image processing device, the printing system, and the computer program. For example, it can be realized in the aspect of an image processing method, a non-transitory storage medium in which a computer program is recorded, or the like.

What is claimed is:

1. An image processing device comprising:
an image data acquisition section that acquires image data;
a printing condition acquisition section that acquires a printing condition including a type of a print medium;
a color conversion section that performs color conversion on the image data according to the printing condition;
a shielding degree calculation section that calculates a shielding degree of a printed layer for a printed object, wherein the printed layer is formed on the front surface of the print medium, which is transparent or translucent; and
a rendering section that generates a rendering image, which represents the printed object, by performing rendering on the 3-dimensional object, which represents the shape of the print medium, by mapping the image data on which the color conversion was performed, wherein
the rendering section generates, by performing the rendering using the shielding degree of the printed layer, at least one of a front surface view of the printed object observed from a front surface side and a back surface view of the printed object observed from a back surface side.

2. The image processing device according to claim 1, further comprising:
a parameter acquisition section that acquires a texture parameter representing a texture of the print medium, wherein
the rendering section performs the rendering by mapping the texture parameter to the 3-dimensional object.

3. The image processing device according to claim 2, wherein
the texture parameter includes medium shielding degree information that indicates a shielding degree of the print medium.

4. The image processing device according to claim 1, wherein
the printed object is a first printed object on which a first printed layer is formed, the first printed layer including a back surface layer, which is a back surface image observed from the back surface side, a special color layer, which is formed with a special color ink, and a front surface layer, which is a front surface image observed from the front surface side, in this order, on the front surface of the print medium,
the shielding degree calculation section calculates the shielding degrees of the back surface layer, the special color layer, and the front surface layer, and
the rendering section generates at least one of a first front surface view of the first printed object observed from the front surface side and a first back surface view of the first printed object observed from the back surface side, by performing the rendering using the shielding degrees of the back surface layer, the special color layer, and the front surface layer.

5. The image processing device according to claim 1, wherein
the printed object is a second printed object on which a second printed layer is formed, the second printed object including a special color layer, which is formed with a special color ink, and a front surface layer, which is a front surface image observed from the front surface side, in this order, on the front surface of the print medium,
the shielding degree calculation section calculates the shielding degrees of the special color layer and the front surface layer, and
the rendering section generates at least one of a second front surface view of the second printed object, which is observed from the front surface side, and a second back surface view of the second printed object, which is observed from the back surface side, by performing the rendering using the shielding degrees of the special color layer and the front surface layer.

6. The image processing device according to claim 1, wherein
the printed object is a third printed object on which a third printed layer is formed, the third printed layer including a back surface layer, which is a back surface image observed from the back surface side, and a special color layer, which is formed with a special color ink, in this order, on the front surface of the print medium,
the shielding degree calculation section calculates the shielding degrees of the back surface layer and the special color layer, and
the rendering section generates at least one of a third front surface view of the third printed object observed from the front surface side and a third back surface view of the third printed object observed from the back surface side, by performing the rendering using the shielding degrees of the back surface layer and the special color layer.

7. The image processing device according to claim 1, wherein
the color conversion section converts input image data to managed image data by performing
a first color conversion from an input color space to a device-independent color space using an input profile,
a second color conversion from the device-independent color space to a device-dependent color space for a printing device using an media profile,
a third color conversion from the device-dependent color space to the device-independent color space using the media profile, and
a fourth color conversion from the device-independent color space to a rendering color space using an common color space profile
in this order and
the rendering section performs the rendering using the managed image data.

8. The image processing device according to claim 7, wherein
the shielding degree calculation section calculates the shielding degree of the printed layer for each pixel using device color image data obtained by performing the first color conversion and the second color conversion.

9. The image processing device according to claim 1, wherein
the 3-dimensional object is comprised of a first polygon object and a second polygon object, which are located parallel to each other and
the rendering section performs the rendering for the print medium using the first polygon object, and performs the rendering for the printed layer using the second polygon object.

10. The image processing device according to claim 1, wherein the 3-dimensional object is comprised of a single polygon object and the rendering section performs the rendering for the printed object, which includes the print medium and the printed layer, using the polygon object.

11. A printing system comprising:

an image processing device according to claim 1;

a display device that displays the rendering image generated by the image processing device; and a printing device that prints the printed object.

12. A non-transitory computer-readable recording medium having stored therein a image processing program, the image processing program causing a computer to perform:

an image data acquisition function that acquires image data;

a printing condition acquisition function that acquires a printing condition including a type of a print medium;

a color conversion function that performs color conversion on the image data according to the printing condition;

a shielding degree calculation function that calculates a shielding degree of a printed layer, with respect to a printed object in which the printed layer is formed on the front surface of the print medium, which is transparent or translucent; and a rendering function that generates a rendering image, which represents the printed object, by performing rendering on the 3-dimensional object, which represents the shape of the print medium, by mapping the image data on which the color conversion was performed, wherein the rendering function includes a function to generate at least one of a front surface view of the printed object observed from a front surface side and a back surface view of the printed object observed from a back surface side, by performing the rendering using the shielding degree of the printed layer.

\* \* \* \* \*